United States Patent
Kojima et al.

(10) Patent No.: US 9,977,367 B2
(45) Date of Patent: May 22, 2018

(54) TONER, TONER HOUSING UNIT, AND IMAGE FORMING APPARATUS

(71) Applicants: Satoshi Kojima, Kanagawa (JP); Satoshi Takahashi, Kanagawa (JP); Tatsuru Moritani, Shizuoka (JP); Shosuke Aoai, Kanagawa (JP); Tatsuki Yamaguchi, Kanagawa (JP)

(72) Inventors: Satoshi Kojima, Kanagawa (JP); Satoshi Takahashi, Kanagawa (JP); Tatsuru Moritani, Shizuoka (JP); Shosuke Aoai, Kanagawa (JP); Tatsuki Yamaguchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/340,647

(22) Filed: Nov. 1, 2016

(65) Prior Publication Data

US 2017/0153574 A1    Jun. 1, 2017

(30) Foreign Application Priority Data

Nov. 26, 2015   (JP) ................... 2015-230563

(51) Int. Cl.
 *G03G 9/087*  (2006.01)
 *G03G 15/08*  (2006.01)
(52) U.S. Cl.
 CPC ......... *G03G 15/0865* (2013.01); *G03G 9/087* (2013.01)

(58) Field of Classification Search
 CPC .......................... G03G 15/0865; G03G 9/087
 See application file for complete search history.

(56) References Cited

U.S. PATENT DOCUMENTS

| | | |
|---|---|---|
| 2007/0059063 A1 | 3/2007 | Nakayama et al. |
| 2007/0218383 A1 | 9/2007 | Seshita et al. |
| 2007/0218385 A1 | 9/2007 | Kojima et al. |
| 2008/0069616 A1 | 3/2008 | Kojima et al. |
| 2008/0070144 A1 | 3/2008 | Nagatomo et al. |
| 2008/0227015 A1 | 9/2008 | Nagatomo et al. |
| 2008/0233505 A1 | 9/2008 | Nagatomo et al. |
| 2008/0292985 A1 | 11/2008 | Suzuki et al. |
| 2009/0067876 A1 | 3/2009 | Seshita et al. |
| 2009/0142093 A1 | 6/2009 | Sawada et al. |
| 2009/0142094 A1 | 6/2009 | Sawada et al. |
| 2009/0142685 A1 | 6/2009 | Nagatomo et al. |
| 2009/0142686 A1 | 6/2009 | Kojima et al. |
| 2010/0075243 A1 | 3/2010 | Shimota et al. |

(Continued)

FOREIGN PATENT DOCUMENTS

| | | |
|---|---|---|
| JP | 6-202376 | 7/1994 |
| JP | 7-152202 | 6/1995 |

(Continued)

*Primary Examiner* — Thorl Chea
(74) *Attorney, Agent, or Firm* — Oblon, McClelland, Maier & Neustadt, L.L.P.

(57) ABSTRACT

A toner includes a toner base particle including a binder resin; a release agent; and an inorganic fine particle, and an external additive. The inorganic fine particle is silica having an average abundance ratio at the surface of the toner base particle of from 70% to 90%. The toner base particle has a BET specific surface area of from 1.0 $m^2/g$ to 2.5 $m^2/g$ after the external additive is removed from the toner.

15 Claims, 6 Drawing Sheets

(56) References Cited

U.S. PATENT DOCUMENTS

| | | |
|---|---|---|
| 2010/0119255 A1 | 5/2010 | Seshita et al. |
| 2011/0003244 A1 | 1/2011 | Inoue et al. |
| 2011/0033794 A1 | 2/2011 | Watanabe et al. |
| 2011/0065033 A1 | 3/2011 | Uchinokura et al. |
| 2011/0255899 A1 | 10/2011 | Iwamoto et al. |
| 2011/0262856 A1 | 10/2011 | Sugimoto et al. |
| 2011/0305986 A1 | 12/2011 | Ogawa et al. |
| 2012/0064445 A1 | 3/2012 | Kojima et al. |
| 2012/0264043 A1 | 10/2012 | Watanabe et al. |
| 2012/0264049 A1 | 10/2012 | Masuda et al. |
| 2012/0270147 A1 | 10/2012 | Katoh et al. |
| 2013/0022371 A1 | 1/2013 | Kusahara et al. |
| 2013/0069263 A1 | 3/2013 | Katoh et al. |
| 2013/0157193 A1 | 6/2013 | Moritani et al. |
| 2013/0216944 A1* | 8/2013 | Shiba ............... G03G 9/0819 430/105 |
| 2013/0224648 A1 | 8/2013 | Honda et al. |
| 2013/0243488 A1 | 9/2013 | Kojima et al. |
| 2013/0244155 A1 | 9/2013 | Satoh et al. |
| 2013/0244156 A1 | 9/2013 | Kojima et al. |
| 2013/0244158 A1 | 9/2013 | Awamura et al. |
| 2013/0273188 A1 | 10/2013 | Takahashi et al. |
| 2014/0038100 A1 | 2/2014 | Katoh et al. |
| 2014/0072349 A1 | 3/2014 | Sakashita et al. |
| 2014/0097267 A1 | 4/2014 | Shitara et al. |
| 2014/0140731 A1 | 5/2014 | Hozumi et al. |
| 2014/0141110 A1 | 5/2014 | Katoh et al. |
| 2014/0220485 A1 | 8/2014 | Kojima et al. |
| 2014/0234767 A1 | 8/2014 | Awamura et al. |
| 2014/0242514 A1 | 8/2014 | Inoue et al. |
| 2014/0272695 A1 | 9/2014 | Moritani et al. |
| 2014/0348546 A1 | 11/2014 | Kojima et al. |
| 2015/0104739 A1 | 4/2015 | Nagatomo et al. |
| 2015/0108671 A1 | 4/2015 | Norikane et al. |
| 2015/0198902 A1 | 7/2015 | Saito et al. |
| 2015/0234303 A1 | 8/2015 | Moriya et al. |
| 2015/0241804 A1 | 8/2015 | Takahashi et al. |
| 2015/0261111 A1 | 9/2015 | Inoue et al. |
| 2015/0261144 A1 | 9/2015 | Sakashita et al. |
| 2015/0362852 A1 | 12/2015 | Moriya et al. |
| 2016/0077455 A1 | 3/2016 | Moriya et al. |
| 2016/0124332 A1 | 5/2016 | Takahashi et al. |

FOREIGN PATENT DOCUMENTS

| | | |
|---|---|---|
| JP | 2003-262976 | 9/2003 |
| JP | 2003-262977 | 9/2003 |
| JP | 2003-280236 | 10/2003 |
| JP | 2007-108684 | 4/2007 |
| JP | 2008-242416 | 10/2008 |

* cited by examiner

TONER, TONER HOUSING UNIT, AND IMAGE FORMING APPARATUS

CROSS-REFERENCE TO RELATED APPLICATIONS

This patent application is based on and claims priority pursuant to 35 U.S.C. § 119 to Japanese Patent Application No. 2015-230563, filed on Nov. 26, 2015, in the Japan Patent Office, the entire disclosure of which is hereby incorporated by reference herein.

BACKGROUND

Technical Field

The present invention relates to a toner, a toner housing unit and an image forming apparatus.

Description of the Related Art

Recently, electrophotographic copiers or printers capable of producing images having higher quality are demanded. In order to satisfy this demand, toners having smaller particle diameters are positively developed. Conventionally, pulverization methods are widely used, which melt and knead a binder resin, a colorant, etc., and pulverize and classify the kneaded mixture. However, toners prepared with the pulverization methods have wide particle diameter distributions, and have limits in having smaller particle diameters technically and in productivity such as yield. These days, polymerization toners with such as suspension polymerization methods and emulsion polymerization aggregation methods are studied.

SUMMARY

A toner includes a toner base particle including a binder resin; a release agent; and an inorganic fine particle, and an external additive. The inorganic fine particle is silica having an average abundance ratio at the surface of the toner base particle of from 70% to 90%. The toner base particle has a BET specific surface area of from 1.0 m$^2$/g to 2.5 m$^2$/g after the external additive is removed from the toner.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
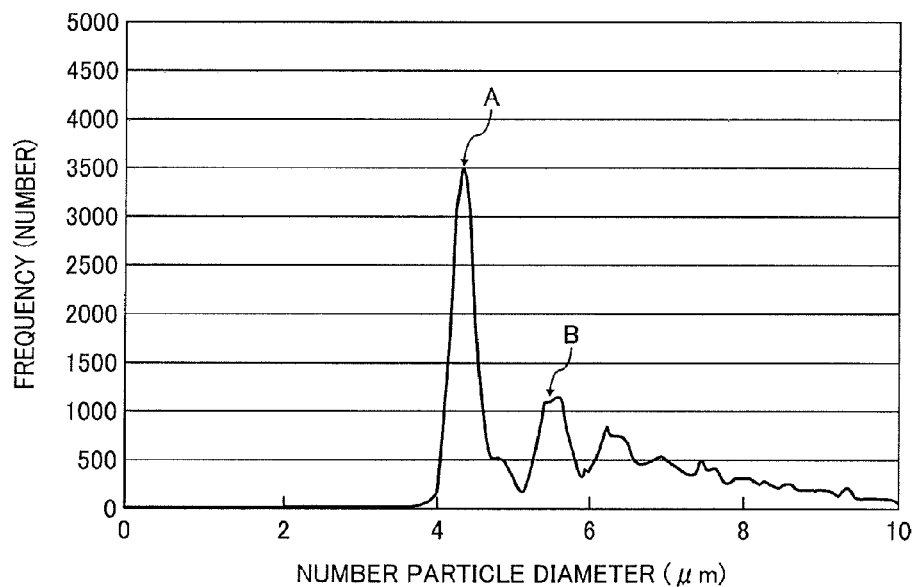
FIG. 1 is a diagram showing an example of distribution plotted with a number particle diameter and frequency (number) of an embodiment of the toner of the present invention.

Accordingly, one object of the present invention is to provide a toner capable of keeping high transferability regardless of degree of deterioration while deformed to be cleanable without impairment of low-temperature fixability.

Another object of the present invention is to provide a toner housing unit housing the above-described toner.

A further object of the present invention is to provide an image forming apparatus using the above-described toner.

More particularly, the present invention relates to a toner, including a toner base particle including a binder resin; a release agent; and an inorganic fine particle, and an external additive, wherein the inorganic fine particle is silica having an average abundance ratio at the surface of the toner base particle of from 70% to 90%, and the toner base particle has a BET specific surface area of from 1.0 m$^2$/g to 2.5 m$^2$/g after the external additive is removed from the toner.

In the present disclosure, the average abundance ratio (Xsurf) of the inorganic fine particle at the surface of the toner base particle is preferably 70% to 90%. The Xsurf is an average abundance ratio of the inorganic fine particle present in an area within 200 nm from the surface of the toner base particle in a cross-sectional image obtained by observing with a transmission electron microscope (TEM).

A toner having Xsurf of from 70% to 90% is deformed having concavities and convexities on the surface to improve cleanability. Xsurf needs to be 70% to 90%, and preferably from 75% to 80%.

When Xsurf is less than 70%, a difference of density of the inorganic fine particle between the surface of the toner base particle and the whole of the toner base particle is not enough to form sufficient concavities and convexities on the surface of the toner, and the toner is not deformed enough to have sufficient cleanability. When greater than 90%, exposure of the inorganic fine particle on the surface of the toner increases to impair exuding of wax, and fixability may deteriorate. An inorganic fine particle layer is preferably formed along the surface profile (concavities and convexities) of the toner base particle, and the inorganic fine particle layer may not be formed on the entire surface of the toner base particle.

The toner having Xsurf of from 70% to 90% is prepared by, e.g., the following method.

(1) A droplet solidifier dries at from 55° C. to 70° C.
(2) Controlling an amount of the release agent added.
(3) Controlling an amount of organo silica sol added.

The toner base particles are dispersed in a saturated aqueous solution including 67% by mass of saccharose and frozen at −100° C. The frozen was cut by a cryomicrotome EM-FCS from Leica Microsystems to be a slice having a thickness about 1,000 Å. A cross-section of the particle is photographed at a magnification of 10,000 times with a transmission electron microscope JEM-2010 from JEOL Ltd. In a cross-section having the largest area, an areal ratio of shadows of the inorganic fine particles in an area 200 nm from the surface of the toner base particle in an inner vertical direction is determined with an image analyzer nexus NEW CUBE ver. 2.5 from NEXUS. Randomly-selected 10 toner particles are measured and an average thereof is Xsurf.

A thickness of the inorganic fine particle layer formed at the surface of the toner base particle can be measured by analyzing a cross-sectional image of the resin particle obtained with a transmission electron microscope (TEM). Specifically, the toner is dispersed in a saturated aqueous solution including 67% by mass of saccharose and frozen at −100° C. The frozen was cut by a cryomicrotome to be a slice having a thickness about 1,000 Å. After the inorganic fine particle is dyed with ruthenium tetroxide, a cross-section of the resin particle is photographed at a magnification of 10,000 times with a transmission electron microscope. In a cross-section having the largest area, in an area a specific distance from the surface of the toner base particle in an inner vertical direction determined with an image analyzer nexus NEW CUBE ver. 2.5 from NEXUS, a maximum distance at which the area of the inorganic fine particle layer occupies not less than 50% is a thickness of the inorganic fine particle layer. Randomly-selected 10 resin particles are measured and an average thereof is the thickness of the inorganic fine particle layer.

When it is difficult to identify the inorganic fine particle layer from the resin on a TEM image, the above cross-section of the resin particle is subjected to mapping with apparatuses capable of compositionally mapping such as energy dispersion X-ray spectroscopes EDX and electronic energy loss spectroscopes. The inorganic fine particle layer is identified from a compositional distribution image obtained from analysis, and the thickness of the inorganic fine particle layer is determined by the above method.

The inorganic fine particle layer preferably has a thickness of from 0.005 μm to 0.5 μm, more preferably from 0.01 μm to 0.2 μm, and furthermore preferably from 0.02 μm to 0.1 μm. The inorganic fine particle layer is formed by discharging to form a droplet of a toner material liquid in which at least a binder resin and an inorganic fine particle are dispersed or dissolved in an organic solvent, quickly drying the droplet right after the droplet is formed to form a solid particle, drying the solvent to form a toner base particle.

It is thought that the concavities and convexities on the surface of the toner base particle are formed because, in the process of drying the solvent, when the toner base particle contracts in volume, the inorganic fine particle layer makes the surface area reduction speed noticeably slower than the volume contraction speed and appropriately elasticizes the surface of the toner base particle to make a viscosity of the surface of the particle higher than that in the particle.

The toner base particle needs to have a BET specific surface area of from 1.0 m$^2$/g to 2.5 m$^2$/g, and preferably from 1.1 m$^2$/g to 2.0 m$^2$/g after the external additive is removed from the toner. When less than 1.0 m$^2$/g, there are almost no concavities and convexities on the surface of the toner base particle, and the toner is difficult to have cleanability. When greater than 2.5 m$^2$/g, the toner has more points contacting the other materials and deteriorate. The external additive is buried or desorbed to deteriorate in transferability and produce abnormal images due to poor chargeability.

The toner base particle having a BET specific surface area of from 1.0 m$^2$/g to 2.5 m$^2$/g is prepared by, e.g., the following method.

(1) Changing an organo silica sol
(2) Including a droplet forming process and a droplet solidifying process.
(3) Drying the droplet at from 55° C. to 70° C. with a droplet solidifier.

<<Binder Resin>>

The binder resin is not particularly limited as long as it is soluble in an organic solvent used in preparation methods mentioned later, and conventional resins can be appropriately selected. Specific examples thereof include, but are not limited to, vinyl polymers formed of styrene monomers, acrylic monomers, methacrylic monomers, etc.; copolymers of these monomers or two or more of these monomers; polyester polymers; polyol resins; phenol resins; silicone resins; polyurethane resins; polyamide resins; furan resins; epoxy resins; xylene resins; terpene resins; chroma indene resins; polycarbonate resins; and petroleum resins. These may be used alone or in combination.

—Vinyl Monomers—

Specific examples of the styrene monomers include, but are not limited to, styrenes such as o-methylstyrene, m-methylstyrene, p-methylstyrene, p-phenylstyrene, p-ethylstyrene, 2, 4-dimethylstyrene, p-n-amyl styrene, p-tert-butyl styrene, p-n-hexylstyrene, p-n-octylstyrene, p-n-nonylstyrene, p-n-decylstyrene, p-n-dodecylstyrene, p-methoxystyrene, p-chlorostyrene, 3, 4-dichlorostyrene, m-nitrostyrene, o-nitrostyrene, p-nitro or their derivatives.

Specific examples of the acrylic monomers include, but are not limited to, acrylic acids and esters of acrylic acids. Specific examples of the esters of acrylic acids include, but are not limited to, methylacrylate, ethylacrylate, propylacrylate, n-butylacrylate, isobutylacrylate, n-octylacrylate, n-dodecylacrylate, 2-ethylhexylacrylate, stearylacrylate, 2-chlorethylacrylate and phenylacrylate.

Specific examples of the methacrylic monomers include, but are not limited to, methacrylic acids and esters of methacrylic acids. Specific examples of the esters of methacrylic acids include, but are not limited to, methylmethacrylate, ethylmethacrylate, propylmethacrylate, n-butylmethacrylate, isobutylmethacrylate, n-octylmethacrylate, n-dodecylmethacrylate, 2-ethylhexylmethacrylate, stearylmethacrylate, phenylmethacrylate, dimethyl methacrylate aminoethyl and diethyl methacrylate aminoethyl.

Specific examples of the other monomers forming the vinyl polymers or copolymers include, but are not limited to, the following (1) to (18).

(1) Monoolefins such as ethylene, propylene, butylene and isobutylene.
(2) Polyenes such as butadiene and isoprene.
(3) Halogenated vinyls such as vinylchloride, vinylidenechloride, vinylbromide and vinylfluoride.
(4) Vinyl esters such as vinylacetate, vinylpropionate and vinyl benzoate.
(5) Vinylethers such as vinylmethylether, vinylethylether and vinylisobutylether.
(6) Vinylketones such as vinylmethylketone, vinylhexylketone and methyl isopropenylketone.
(7) N-vinyl compounds such as N-vinylpyrrole, N-vinylcarbazole, N-vinylindole and N-vinylpyrrolidone.
(8) Vinylnaphthalenes.
(9) Acrylic or methacrylic acid derivatives such as acrylonitrile, methacrylonitrile and acrylamide.
(10) Unsaturated dibasic acids such as maleic acid, citraconic acid, itaconic acid, alkenyl succinic acid, fumaric acid and mesaconic acid.
(11) Unsaturated dibasic acid anhydrides such as maleic acid anhydride, citraconic acid anhydride, itaconic acid anhydride and alkenyl succinic acid anhydride.
(12) Unsaturated dibasic acid monoesters such as monomethyl ester maleate, monoethyl ester maleate, monobutyl ester maleate, monomethyl ester citraconate, monoethyl ester citraconate, monobutyl ester citraconate, monomethyl ester itaconate, monomethyl ester alkenyl succinate, monomethyl ester fumarate and monomethyl ester mesaconate.
(13) Unsaturated dibasic acid esters such as dimethyl maleate and dimethyl fumarate.

(14) α, β-unsaturated acid such as crotonic acid and cinnamic acid.

(15) α, β-unsaturated acid anhydrides such as crotonic acid anhydride and cinnamic acid anhydride.

(16) Monomers having a carboxyl group such as anhydrides of the α, β-unsaturated acid and lower fatty acid, alkenyl malonate, alkenyl glutarate, alkenyl adipate and their acid anhydrides and monoesters.

(17) Hydroxyalkyl ester acrylate or methacrylate such as 2-hydroxyethylacrylate, 2-hydroxyethylmethacrylate and 2-hydroxypropylmethacrylate.

(18) Monomers having a hydroxyl group such as 4-(1-hydroxy-1-methylbutyl)styrene and 4-(1-hydroxy-1-methylhexyl)styrene.

The copolymers of the binder resin may have a structure crosslinked with a crosslinker having two or more vinyl groups.

Specific examples of the crosslinker include, but are not limited to, aromatic divinyl compounds such as divinylbenzene, divinyl naphthalene; diacrylate compounds bonded with alkyl chains such as ethyleneglycol diacrylate, 1, 3-butylene glycol diacrylate, 1, 4-butanediol diacrylate, 1, 5-pentanediol diacrylate, 1, 6-hexanediol diacrylate, neopentylglycol diacrylate and these compounds except the acrylates are replaced with methacrylates; and diacrylate compounds bonded with an alkyl chain including an ether bond such as diethyleneglycol diacrylate, avian ethyleneglycol diacrylate, tetraethyleneglycol diacrylate, polyethylene glycol #400 diacrylate, polyethylene glycol #600 diacrylate, dipropylene glycol diacrylate and these compounds except the acrylates are replaced with methacrylates.

In addition, diacrylate and dimethacrylate compounds bonded with a chain including an aromatic group and an ether bond can also be used.

In addition, the crosslinker includes polyester diacrylates such as MANDA from Nippon Kayaku Co., Ltd.

Further, the crosslinker includes multifunctional crosslinkers such as pentaerythritol triacrylate, trimethylolethane triacrylate, trimethylol propane triacrylate, tetramethylol methane tetraacrylate, oligoester acrylate, these compounds except the acrylates are replaced with methacrylates, triallyl cyanurate and triallyltrimellitate. Among these crosslinkers, the aromatic divinyl compounds and the diacrylate compounds bonded with a chain including an aromatic group or an ether bond are preferably used in terms of fixability and offset resistance of the resultant toner. When the binder resin is a styrene-acrylic resin, in a molecular weight distribution of tetrahydrofuran (THF)-soluble resin components by GPC, at least one peak is preferably present in a range of number-average molecular weight of from 3,000 to 50,000.

—Polyester Resin—

Monomers forming the polyester resin are preferably formed of, but are not limited to, alcoholic components and acidic components.

Specific examples of the alcoholic components include the followings.

Specific examples of dihydric alcohol include, but are not limited to, ethylene glycol, propylene glycol, 1, 3-butanediol, 1, 4-butanediol, 2, 3-butanediol, diethylene glycol, triethylene glycol, 1, 5-pentanediol, 1, 6-hexanediol, neopentyl glycol, 2-ethyl-1, 3-hexanediol, hydrogenated bisphenol A, or diols obtained by polymerizing a cyclic ether such as ethylene oxide or propylene oxide with bisphenol A.

Combination of a tri- or more polyhydric alcohol and a tri- or more valent acid is able to crosslink the polyester resin, but amounts thereof used may not prevent the resin from being dissolved in an organic solvent.

Specific examples of the tri- or more polyhydric alcohols include, but are not limited to, sorbitol, 1, 2, 3, 6-hexanetetrol, 1, 4-sorbitan, pentaerythritol for example, dipentaerythritol and tripentaerythritol, 1, 2, 4-butanetriol, 1, 2, 5-pentatriol, glycerol, 2-methylpropanetriol, 2-methyl-1, 2, 4-butanetriol, trimethylolethane, trimethylolpropane, and 1, 3, 5-trihydroxybenzene.

Specific examples of acid components used to form the polyester polymer include, but are not limited to, benzene dicarboxylic acids such as phthalic acid, isophthalic acid, and terephthalic acid or their anhydrides, alkyl dicarboxylic acids such as succinic acid, adipic acid, sebacic acid, and azelaic acid, or their anhydrides, unsaturated dibasic acids such as maleic acid, citraconic acid, itaconic acid, alkenylsuccinic acid, fumaric acid, and mesaconic acid, unsaturated dibasic acid anhydrides such as maleic acid anhydride, citraconic acid anhydride, itaconic acid anhydride, and alkenylsuccinic acid anhydride.

Also, examples of trivalent or more polyvalent carboxylic acid components include trimellitic acid, pyromellitic acid, 1, 2, 4-benzenetricarboxylic acid, 1, 2, 5-benzenetricarboxylic acid, 2, 5,7-naphthalene tricarboxylic acid, 1, 2, 4-naphthalenetricarboxylic acid, 1, 2, 4-butanetricarboxylic acid, 1, 2, 5-hexanetricarboxylic acid, 1, 3-dicarboxy-2-methyl-2-methylenecarboxypropane, tetra(methylene carboxy)methane, 1, 2, 7, 8-octanetetracarboxylic acid, En Pol trimer acid, or their anhydrides or partially lower-alkyl esters.

In the present disclosure, the binder resin preferably includes a polyester resin as a main component. Particularly when the release agent mentioned later is an ester wax including a fatty acid ester as a main component, the binder resin is preferably a polyester resin.

The polyester resin as a binder resin preferably includes elements soluble with tetrahydrofuran (THF), having at least one peak in a range of 3,000 to 50,000 (number-average molecular weight) in a molecular weight distribution in terms of the fixability and offset resistance of the resultant toner. In addition, the THF-soluble elements having a molecular weight not greater than 100,000 is preferably from 70% to 100% by weight based on total weight of the THF-soluble elements. Further, the THF-soluble elements preferably have a main peak in a molecular weight range of from 5,000 to 20,000.

In the present disclosure, the molecular weight of the binder resin is measured by gel permeation chromatography (GPC) using THF as a solvent.

When the binder resin is a polyester resin, the binder resin preferably has an acid value of from 0.1 to 100 mg KOH/g, more preferably from 0.1 to 70 mg KOH/g, and furthermore preferably from 0.1 to 50 mg KOH/g.

In the present disclosure, the acid value of the binder resin of the toner composition is obtained by the following method. Its basic procedures are based on JIS K-0070.

(1) With regard to the sample, additives are removed or the contents and the acid values of the resin and the component other than the resin are obtained in advance.

A sample pulverized product is weighed precisely in an amount of 0.5 g to 2.0 g to find the weight W (g) of the polymer component. To obtain the acid value of the binder resin from the toner, for example, the acid values and contents of a colorant, magnetic body or the like are measured separately to find the acid value of the binder resin by calculation.

(2) The sample is placed into a 300 ml beaker and 150 ml of a liquid mixture of toluene/ethanol (ratio by volume: 4/1) is added to dissolve the sample.

(3) An ethanol solution of 0.1 mol/l of KOH is used to titrate by using a potentiometric titrator.

(4) The amount of the KOH solution is S (ml) and at the same time, a control (blank) is measured to find the amount of the KOH solution used as B (ml) to calculate the acid value using the following formula. In the formula, f represents a factor of KOH.

$$\text{Acid value (mg KOH/g)} = [(S-B) \times f \times 5.61]/W \quad (1)$$

The binder resin and a toner composition including the binder resin preferably have a glass transition temperature (Tg) of from 35° C. to 80° C. and more preferably from 40° C. to 70° C. in terms of the toner preservability. When Tg is too low, the toner tends to deteriorate a high-temperature atmosphere and also, offset tends to occur in the fixing process. When Tg is excessively high, the fixability easily deteriorates.

The binder resin may be selected from the above depending on organic solvents and release agents. A release agent having high solubility in an organic solvent may lower a softening point of the toner. In such a case, a weight-average molecular weight and a softening point of the binder resin are effectively increased to maintain hot offset resistance.

<<Release Agent>>

Known release agents can be used if soluble in organic solvents, and waxes are preferably used.

Specific examples of the release agent include, but are not limited to, aliphatic hydrocarbon waxes such as low-molecular-weight polyethylene, low-molecular-weight polypropylene, polyolefin wax, microcrystalline wax, paraffin wax and sasol waxes; oxides of aliphatic hydrocarbon wax or their block copolymers such as oxidized polyethylene wax; plant waxes such as candelilla wax, carnauba wax, tree wax and jojoba wax; animal waxes such as bees wax, lanoline and whale wax; mineral waxes such as okezolite, ceresin and petrolatum; waxes composed primarily of fatty acid esters such as Montan acid ester wax and caster wax; various synthetic ester wax; and synthetic amide wax.

Other examples of the release agent include saturated straight-chain fatty acids such as palmitic acid, stearic acid, Montan acid and other straight-chain alkyl carboxylic acids having a straight-chain alkyl group; unsaturated fatty acid such as piperazine acid, eleostearic acid, parinaric acid, saturated alcohol such as stearyl alcohol, eicosyl alcohol, behenyl alcohol, caunapiru alcohol, ceryl alcohol, mecyryl alcohol and other long-chain alkyl alcohols; polyols such as sorbitol; fatty acid amides such as linoleate amide, olefin acid amide and laurate amide; saturated fatty acid bisamide such as methylene biscapric acid amide, ethylene bislaurate amide and hexamethylene bisstearic acid amide; unsaturated fatty acid amide such as ethylene bisoleic acid amide, hexamethylene bisoleic acid amide, N, N'-dioleyl adipic acid amide and N, N'-dioleyl sebacic acid amide; aromatic bisamide such as m-xylene bisstearic acid amide and N, N-distearyl isophthalic acid amide; fatty acid metal salts such as calcium stearate, calcium laurate, zinc stearate and magnesium stearate; aliphatic hydrocarbon waxes grafted with vinyl monomers such as styrene or acrylic acid; partial ester compounds of a fatty acid such as behenic acid monoglyceride and polyol; and methyl ester compounds having a hydroxyl group which is provided by hydrogenating vegetable fat, etc.

These waxes the molecular weights of which are sharpened by a press sweat method, a solvent method, a recrystallization method, a vacuum distillation method, a super critical gas abstraction method or a solution crystallization method; and the waxes a low-molecular-weight solid fatty acid, a low-molecular-weight solid alcohol, a low-molecular-weight solid compound or other impurities are removed from are also preferably used as a release agent.

In the present disclosure, the content of the release agent is preferably controlled to obtain a toner having a desired particle diameter and a desired shape. An amount W of the release agent extracted from 1.0 g of a toner with n-hexane is preferably from 5 mg to 30 mg. When less than 5 mg, the wax on the surface of the toner is insufficient and releasability deteriorates, and may deteriorate in offset resistance including low-temperature fixability. When greater than 30 mg, the wax on the surface is too much, resulting in deterioration of image quality due to wax spent on carrier and transferability.

The extracted amount of the release agent is measured by the following method. The content of the release agent is not particularly limited if the above W is in a desired range, but preferably from 4 parts by mass to 30 parts by mass, and more preferably from 4 parts by mass to 17 parts by mass per 100 parts by mass of the binder resin.

The amount W of the release agent extracted with n-hexane is measured by the following method, based on specified quantities in Table 1.

TABLE 1

|  | Set value | Allowance |
| --- | --- | --- |
| Specified Value 1 | 1.00 g | +0.01 g, −0.00 g |
| Specified Value 2 | 4.60 g | +0.03 g, −0.00 g |
| Specified Value 3 | Scale: 5 | — |
| Specified Value 4 | 1 min | — |
| Specified Value 5 | 4,000 rpm, 1 sec | — |
| Specified Value 6 | 3.00 g | +0.02 g, −0.00 g |
| Specified Value 7 | 0.02 Mpa | — |
| Specified Value 8 | 2 min | — |

1) Hexane (Specified Value 2) is placed in a centrifuge tube using dispensette.
2) Toner (Specified Value 1) is placed on a medical paper using a scale
3) The toner is placed in the centrifuge tube using a tube rack, and the tube is capped.
4) Scale of voltex is set to Specified Value 3 and the toner in the tuber is stirred for Specified Value 4.
5) The centrifuge tube is placed in a centrifugal machine to precipitate the toner after rotated and held (Specified Value 5).
6) An aluminum cup with a handle is weighed (X).
7) Specified Value 6 of the supernatant liquid are placed in the aluminum cup, and the cup is placed in a vacuum drier having a temperature of 150° C.
8) A pressure scale of the vacuum drier is set to 7 to burn off hexane in 5 min.
9) The aluminum cup is taken out from the vacuum drier and placed in a desiccator to be cooled for Specified Value 8.
10) The aluminum cup is weighed (Y).
11) Extracted amount of wax (mg)=(Y−X)×1,000×4.6/3

<<Inorganic Fine Particle>>

The inorganic fine particle needs to be silica.

It is preferable that the inorganic fine particles are involved in a toner and some of them are exposed on the surface of the toner base particle. The inorganic fine particles exposed on the surface improve fluidity of the toner and impart high chargeability thereto.

When silica is used as the inorganic fine particle and a cationic surfactant is used as a charge controlling agent, a hydroxyl group of silica exposed on the surface of a toner and the cationic surfactant are ionically bonded or physically adsorbed with each other. Interactions therebetween can impart higher charge buildability and more charge quantity to the toner. Therefore, an external additive added later as a charge imparting agent can be decreased, which prevents the external additive from releasing and filming on the surface of a carrier of a photoconductor.

A surface silicon atom density (surface Si quantity) caused by silica exposed on the surface of the toner base particle is preferably from 10% by atom to 30% by atom, more preferably from 10% by atom to 20% by atom, and furthermore preferably from 10% by atom to 15% by atom. When less than 10% by atom, the wax is exposed much and may cause wax spent. When greater than 30% by atom, properties of the inorganic fine particle are dominant and may impair properties of the binder resin. The surface Si quantity is mentioned later.

Silica is preferably used in the form of an organosol.

In order to obtain the organosol of silica, a hydrogel dispersion of silica synthesized by a wet method such as hydrothermal methods and sol-gel methods is hydrophobized with a surface treatment, and water is substituted with an organic solvent such as methyl ethyl ketone.

A method disclosed in Japanese published unexamined application No. JP-H11-43319-A is preferably used to prepare the organosol.

The inorganic fine particles preferably have an average primary particle diameter not greater than 100 nm, and more preferably from 10 nm to 50 nm. When greater than 100 nm, the particle diameter of the inorganic fine particle is too large to form concavities and convexities on the surface of the toner base particle.

The surface of the inorganic fine particle is preferably treated with a hydrophobizer. Specific examples of the hydrophobizer include a silane-coupling agent, a sililation agent, a silane-coupling agent containing a fluoroalkyl group, an organic titanate-based coupling agent, an aluminum-based coupling agent, and silicone oil.

It is preferable that the inorganic fine particle is hydrophobized and has a hydrophobicity of from 15% to 55% when measured by the methanol titration method. The inorganic fine particle having such a hydrophobicity preferably proceed deformation of a toner and forms suitable concavities and convexities on the toner. First, 50 ml of ion-exchanged water and 0.2 g of a sample are placed in a beaker and methanol is dripped therein while stirred. Next, as methanol increases in density, the external additive gradually settles. When all the inorganic fine particles settle, a mass fraction of methanol in the mixture of methanol and water is the hydrophobicity (%).

The content of the inorganic fine particles is preferably from 10 parts by mass to 25 parts by mass, and more preferably from 15 parts by mass to 20 parts by mass per 100 parts by mass of the toner base particles.

<Other Components>

The toner of the present invention may include other components such as a colorant, a charge controlling agent and an external additive.

<<Colorant>>

The colorant is appropriately selected depending on the intended purpose without any limitation, and examples thereof include carbon black, a nigrosin dye, iron black, naphthol yellow S, Hansa yellow (10G, 5G and G), cadmium yellow, yellow iron oxide, yellow ocher, yellow lead, titanium yellow, polyazo yellow, oil yellow, Hansa yellow (GR, A, RN and R), pigment yellow L, benzidine yellow (G and GR), permanent yellow (NCG), vulcan fast yellow (5G, R), tartrazine lake, quinoline yellow lake, anthrasan yellow BGL, isoindolinon yellow, colcothar, red lead, lead vermilion, cadmium red, cadmium mercury red, antimony vermilion, permanent red 4R, parared, fiser red, parachloroorthonitro aniline red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G lithol rubin GX, permanent red F5R, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, and lithopone.

The content of the colorant is not particularly limited and may be appropriately selected depending on the intended purpose, but it is preferably 1% to 15% by mass, more preferably 3% to 10% by mass, relative to 100% by mass of the toner.

The colorant may be used as a masterbatch in which the colorant forms a composite with a resin. As a resin used in the production of the masterbatch or a resin kneaded together with the masterbatch, other than the another polyester resin, polymer of styrene or substitution thereof (e.g., polystyrene, poly-p-chlorostyrene, and polyvinyl toluene); styrene copolymer (e.g., styrene-p-chlorostyrene copolymer, styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl c-chloromethacrylate copolymer, styrene-acrylonitrile copolymer, styrene-methyl vinyl ketone copolymer, styrene-butadiene copolymer, styrene-isoprene copolymer, styrene-acrylonitrile-indene copolymer, styrene-maleic acid copolymer, and styrene-maleic acid ester copolymer); and others including polymethyl methacrylate, polybutyl methacrylate, polyvinyl chloride, polyvinyl acetate, polyethylene, polypropylene, polyester, epoxy resin, epoxy polyol resin, polyurethane, polyamide, polyvinyl butyral, polyacrylic acid resin, rosin, modified rosin, a terpene resin, an aliphatic or alicyclic hydrocarbon resin, an aromatic petroleum resin, chlorinated paraffin, and paraffin wax can be used. These may be used alone or in combination.

The masterbatch can be prepared by mixing and kneading the colorant with the resin for the masterbatch with application of a high shearing strength. In the mixing and kneading, an organic solvent may be used for improving the interactions between the colorant and the resin. Moreover, the masterbatch can be prepared by a flashing method in which an aqueous paste containing a colorant is mixed and kneaded with a resin and an organic solvent, and then the colorant is transferred to the resin to remove the water and the organic solvent. This method is preferably used because a wet cake of the colorant is used as it is, and it is not necessary to dry the wet cake of the colorant to prepare a colorant.

In the mixing and kneading of the colorant and the resin, a high-shearing disperser (e.g., a three-roll mill) is preferably used.

The usage of the masterbatch is not particularly limited and may be appropriately selected depending on the intended purpose, but preferably from 0.1 parts by mass to 20 parts by mass per 100 parts by mass of the binder resin.

The masterbatch preferably includes a resin having an acid value not greater than 30 mg KOH/g and an amine value of from 1 to 100 and a colorant dispersed therein, and more preferably includes a resin having an acid value not greater than 20 mg KOH/g and an amine value of from 10 to 50 and a colorant dispersed therein. When the acid value is greater than 30 mg KOH/g, the chargeability of the resultant toner occasionally deteriorates due to high humidity and the colorant is insufficiently dispersed in the masterbatch occasionally.

When the amine value is less than 1 and greater than 100, the colorant is insufficiently dispersed in the masterbatch occasionally. The acid value is measured by the method disclosed in JIS K0700 and the amine value in JIS K7237.

<<<Pigment Dispersion>>>

The colorant may be dispersed with a pigment dispersant to prepare a colorant dispersion. The pigment dispersant is not particularly limited and may be appropriately selected depending on the intended purpose, but preferably has high compatibility with a binder resin in terms of pigment dispersibility. Specific examples of marketed products thereof include AJISPER PB821 and AJISPER PB822 from Ajinomoto Fine-Techno Co., Inc.; Disperbyk-2001 from BYK-Chemie GmbH; and EFKA-4010 from EFKA Additives B.V.

The dispersant preferably has a weight-average molecular weight, i.e., a molecular weight at a maximum main peak in the gel permeation chromatography of a styrene-converted weight, of from 500 to 100,000, more preferably from 3,000 to 100,000, furthermore preferably from 5,000 to 50,000, and most preferably from 5,000 to 30,000 in terms of pigment dispersibility. When less than 500, the dispersant has high polarity, resulting in occasional dispersibility deterioration of the colorant. When greater than 100,000, the dispersant has high affinity with a solvent, resulting in occasional dispersibility deterioration of the colorant.

The dispersant is preferably used in an amount of from 1 part by mass to 200 parts by mass, and more preferably from 5 parts by mass to 80 parts by mass per 100 parts by mass of the colorant. When less than 1 part by mass, dispersibility is insufficient. When greater than 200 parts by mass, the resultant toner occasionally deteriorates in chargeability.

<<Charge Controlling Agent>>

The charge controlling agent is not particularly limited and may be appropriately selected depending on the intended purpose. Examples thereof include a nigrosine-based dye, a triphenylmethane-based dye, a chromium-containing metallic complex dye, a molybdic acid chelate pigment, a rhodamine-based dry, alkoxy-based amine, a quaternary ammonium salt (including a fluorine-modified quaternary ammonium salt), alkylamide, a simple substance or a compound of phosphorus, a simple substance or a compound of tungsten, a fluorine-based activator, a salicylic acid metallic salt, a metallic salt of salicylic acid derivative, etc.

Specific examples thereof include a nigrosine dye BONTRON 03, a quaternary ammonium salt BONTRON P-51, a metal-containing azo dye BONTRON S-34, an oxynaphthoic acid-based metal complex E-82, a salicylic acid-based metal complex E-84 and a phenol condensate E-89 (all products of ORIENT CHEMICAL INDUSTRIES CO., LTD.); quaternary ammonium salt molybdenum complexes TP-302 and TP-415 (all products of Hodogaya Chemical Co., Ltd.); LRA-901; a boron complex LR-147 (product of Japan Carlit Co., Ltd.); a copper phthalocyanine; perylene; quinacridone; an azo-pigment; and polymeric compounds having, as a functional group, a sulfonic acid group, carboxyl group, quaternary ammonium salt, phenol resins, fluorine compounds, etc.

The content of the charge controlling agent depends on the binder resin, optional additives and methods of preparing the toner including the dispersion method. The content thereof is preferably from 0.1 parts by mass to 10 parts by mass, and more preferably from 0.2 parts by mass to 5 parts by mass per 100 parts by mass of the binder resin. When not greater than 10 parts by weight, the toner does not deteriorate in fixability.

The charge controlling agent is preferably dissolved in an organic solvent in terms of production stability, and may be finely dispersed therein.

<<Fluidity Improver>>

The toner of the present embodiment may include a fluidity improver. The fluidity improver is added to the surface of the toner to improve fluidity thereof.

Specific examples of the fluidity improver include, but are not limited to, fine powders of metal oxides and fluorinated resin powders.

The fluidity improver preferably has an average primary particle diameter of from 0.001 μm to 2 μm, and more preferably from 0.002 μm to 0.2 μm.

The fluidity improver preferably has a number-average particle diameter of from 5 nm to 100 nm, and more preferably from 5 nm to 50 nm.

The fluidity improver preferably has a specific surface area not less than 30 $m^2/g$, and more preferably from 60 $m^2/g$ to 400 $m^2/g$ when measured by a BET nitrogen absorption method.

The fluidity improver is preferably included in a toner in an amount of from 0.03 parts by mass to 8 parts by mass per 100 parts by mass of the toner.

<<Cleanability Improver>>

A cleanability improver improving removability of a toner remaining on an electrostatic latent image bearer or a first transfer medium after the toner is transferred onto a recording paper, etc. is not particularly limited and can appropriately be selected according to the intended purpose. Specific examples thereof include fatty acid metallic salts such as zinc stearate, calcium stearate and stearic acid; and polymer particulate materials prepared by a soap-free emulsifying polymerization method such as a polymethylmethacrylate particulate material and a polystyrene particulate material. The polymer particulate materials comparatively have a narrow particle diameter distribution and preferably have a weight-average particle diameter of from 0.01 μm to 1 μm.

The external additives adhere to or are fixed on the surface of a toner. Specific examples of mixers externally adding the external additives include, but are not limited to, V-type Mixer, Rocking Mixer, Loedge Mixer, Nauter Mixer and Henschel Mixer. Hybridizers, Mechanofusion, Q-mixers, etc. are used to fix them on a toner.

<<Properties of Toner>>

<Method of Removing External Additive from Toner>

Three point seventy five (3.75) g of the toner are placed in an aqueous solution including 0.5% surfactant (NOIGEN ET-165 from DKS Co. Ltd.), and the mixture is stirred with a bench roll mill at a rpm not to foam the mixture for 30 min to prepare a toner dispersion A. The dispersion A is applied with an ultrasonic wave by an ultrasonic homogenizer VCX750 from Sonics & Materials, Inc. (ultrasonic oscillator has a height of 1.0 cm, a power of 40 W for 5 min) to prepare a toner dispersion B. The toner dispersion B is transferred in a centrifuge tube and subjected to centrifugal separation at 2,000 rpm for 2 min. A supernatant after separation is wasted, and 60 mL of pure water are added to the precipitated toner to prepare a dispersion slurry. The dispersion slurry is filtered under reduced pressure with a filter paper No 5C 60 φm/m for Kiriyama funnel from Kiriyama glass Co. Sixty (60) mL of pure water are added to the toner remaining on the filter paper to prepare a dispersion slurry. The dispersion slurry is filtered under reduced pressure and washed. The toner remaining on the filter paper is collected and dried in a thermostatic chamber at 40° C. for 8 hrs to obtain a toner base particle.

(Surface Si Quantity)

The surface Si quantity can be measured by an X-ray photoelectron spectroscopy (XPS). The toner surface is an extreme surface at a depth of some nm from the surface.

Silicon atom density caused by silica is measured by an X-ray photoelectron spectroscopy (XPS) analysis using an X-ray photoelectron spectrometer 1600S manufactured by PHI. X ray source is MgKα (power of 400 W) and an analyzed area is from 0.8 mm×2.0 mm. As a pre-treatment, a sample is packed in an aluminum plate and the packed sample is bonded to a sample holder with a carbon sheet. A relative sensitivity factor provided by PHI is used to determine surface atom density.

<Average Primary Particle Diameter of Inorganic Fine Particle>

An average primary particle diameter of the inorganic fine particles present on the surface of the toner base particle can be determined based on a TEM picture of a cross-section of the toner base particle.

Specifically, after the toner is buried in an epoxy resin, the buried toner is cut to a slice. A cross-section thereof is observed with a TEM to abstract three toners as samples for measurement. The slice may be dyed with ruthenium or osmium to emphasize the inorganic fine particles in the toner when necessary. The average primary particle diameter of 10 inorganic fine particles in each of three toners, i.e., an average of the average primary particle diameter of 30 inorganic fine particles is measured.

<BET Specific Surface Area of Toner Base Particle>

The BET specific surface area of the toner base particle is measured by an automatic surface area/pore distribution measurer Tri Star 3000 from Shimadzu Corp. Specifically, 1 g of the toner is placed in an own cell, and the cell is deaerated by an own degassing unit VacuPrep 061 from Shimadzu Corp. The cell is deaerated under depressure at 100 mtorr or less for 20 hrs at room temperature. The BET specific surface area of the toner in the deaerated cell is automatically measured by Tri Star 3000. Nitrogen gas is used as an adsorption gas.

<Content of Release Agent>

An endothermic energy amount of the release agent determined by a differential scanning calorimetry (DSC) method is subjected to mass conversion to obtain the content of the release agent, and which is from 4% by mass to 10% by mass.

The content of the release agent in the toner is 0.05% by mass to 0.1% by mass when measured by FTIR-ATR (infrared spectroscopic analysis of the total reflection absorption) method. The release agent present near the surface of the toner exudes with ease on the surface thereof, and a toner satisfying the above effectively exert releasability. Therefore, an amount of the release agent present near the surface of the toner is preferably from 0.05% by mass to 0.1% by mass. When not less than 0.05% by mass, the toner has sufficient releasability when fixed. When less than 0.1% by mass, the release agent does not exude on the surface of the toner, the toner adhering to the surface of a carrier through the release agent does not increase, and filming resistance of a developer over the surface of a carrier does not deteriorate. The toner satisfying the above has offset resistance, chargeability, developability, and filming resistance.

The total amount of the release agent in a toner measured by DSC method is preferably from 4% by mass to 10% by mass. When not less than 4% by mass, the toner has sufficient releasability when fixed and does not deteriorate in offset resistance. When not greater than 10% by mass, the toner does not deteriorate in filming resistance and does not lose glossiness after fixed.

<Average Circularity of Toner>

A flow-type particle image analyzer FPIA-3000S from SYSMEX CORPORATION can measure the average circularity.

<Analysis Conditions>

Condition 1 Limit of particle diameter: 1.985 μm≤circle-equivalent diameter (number basis)<200.0 μm Condition 2 Limit of particle shape: 0.200≤circularity≤1.000

Condition 3 Limit of number of particles (number of particles satisfying conditions 1 and 2): from 4,800 to 5,200

An outline of FPIA-3000 is explained.

A sample dispersant liquid passes through a flow passage (spreading along the flow direction) of a flat and transparent flow cell (thickness of about 200 [μm]). In order to form an optical passage passing while crossing the thickness of the flow cell, a strobe lamp and a CCD camera are installed to be placed on the opposite sides to each other with respect to the flow cell. While the sample dispersant liquid flows, strobe light is irradiated at intervals of 1/60 seconds in order to obtain images of the particles flowing through the flow cell. As a result, each of the particles is photographed as a two-dimensional image having a fixed range parallel to the flow cell. From an area of the two-dimensional image of each of the particles, the diameter of the circle having the same area is calculated as the circle-equivalent diameter.

The circularity is a ratio between a peripheral length (l) obtained from the two-dimensional image of the particle and a peripheral length (L) of a circle having the same are as that of the particle.

$$\text{Circularity} = (L)/(l)$$

The closer to 1 the circularity, the more spheric the particle.

An average circularity Rave, most frequent diameter (number basis) θmax, a ratio of the particles having a diameter not greater than 0.75×θmax and a circularity not less than 0.980 to the particles satisfying conditions 1 and 2, and a standard deviation of number count values can be measured by the measurer.

The density of the samples dispersion is controlled such that the number of the particles satisfying conditions 1 and 2 are from 4,800 to 5,200.

The toner of the present embodiment preferably has an average circularity of from 0.970 to 0.985, and more preferably from 0.975 to 0.980 to exert effects of good cleanability and good transferability.

<Toner Particle Diameter>

The toner preferably has a volume-average particle diameter of from 1 μm to 8 μm in terms of forming high-resolution, high-definition, and high quality images. In addition, the toner preferably has a particle diameter distribution (volume-average particle diameter/number-average particle diameter) of from 1.00 to 1.15 in terms of forming stable images for long periods.

Further, the toner preferably has a second frequent (number) peak in a range of from 1.21 times to 1.31 times of the most frequent (number) particle diameter (most frequent diameter) in a distribution plotted with the number particle diameter and frequency (number) of the toner.

When the toner has no second frequent (number) peak, particularly when the particle diameter distribution (volume-average particle diameter/number-average particle diameter) is close to 1.00 (monodispersion), the toner has very close repletion and may deteriorate in initial fluidity and cleanability. When the toner has a second frequent (number) peak in a number particle diameter larger than 1.31 times, image granularity deteriorates because the toner includes many coarse powders.

FIG. 1 is a diagram showing an example of distribution plotted with a number particle diameter and frequency (number) of an embodiment of the toner of the present embodiment. In FIG. 1, a horizontal axis is a number particle diameter (μm) and a vertical axis is a frequency (number). There is a second frequent (number) peak (arrow B) in a range of from 1.21 times to 1.31 times of the most frequent diameter (arrow A).

[Measurement of Particle Diameter and Particle Diameter Distribution of Toner]

A volume-average particle diameter (Dv) and a number-average particle diameter (Dn) of the toner are measured by Multisizer III from Beckman Coulter, Inc. with an aperture diameter of 50 μm. After the volumes and the number of toners are measured, distributions thereof are determined. From the distributions, the volume-average particle diameter (Dv) and the number-average particle diameter (Dn) of the toner can be determined. The particle diameter distribution is Dv/Dn. A complete monodispersion is 1, and the larger the number the wider the distribution.

(Developer)

A developer of the present embodiment contains at least the toner, and may further contain appropriately selected other components, such as carrier, if necessary.

The toner of the present embodiment can be used as a two-component developer mixed with a carrier as well as a one-component developer. Particularly, the toner of the present embodiment can effectively be used as a one-component developer because of having improved strength so as not to be crushed by a blade and anti-sticking property.

<Carrier>

Specific examples of the carrier include, but are not limited to, ferrite and magnetite, and resin-coated carriers.

The resin-coated carrier is formed of a carrier core material and a coating material, i.e., a resin coating the surface of the carrier core material.

Specific examples of the resin include styrene-acrylic resins such as a styrene-esteracrylate copolymer and a styrene-estermethacrylate copolymer; acrylic resins such as an esteracrylate copolymer and an estermethacrylate copolymer; fluorine-containing resins such as polytetrafluoroethylene, monochlorotrifluoroethylene polymer and polyvinylidene-fluoride; a silicone resin; a polyester resin; a polyamide resin; polyvinylbutyral; and an aminoacrylate resin. Besides, any resins such as an ionomer resin and a polyphenylenesulfide resin usable as a coating material for a carrier can be used. These can be used alone or in combination.

In addition, a binder carrier core, wherein a magnetic powder is dispersed in a resin, can also be used.

Methods of coating a resin coating material on the surface of the carrier core include dissolving or suspending a resin in a solvent to prepare a coating solution and coating the coating solution thereon; and simply mixing a resin and the carrier core in the state of powders.

The resin-coated carrier preferably includes a resin coating material in an amount of from 0.01 parts by mass to 5 parts by mass, and more preferably from 0.1 parts by mass to 1 part by mass.

Specific examples of usage, wherein a magnetic material is coated with a coating mixture including two or more materials, include carriers formed of (1) 12 parts of a mixture of dimethylchlorosilane and dimethylsilicone oil (5/1) and 100 parts of a fine powder of titanium oxide; and (2) 20 parts of a mixture of dimethylchlorosilane and dimethylsilicone oil (5/1) and 100 parts of a fine powder of silica.

As the resin coating material, a styrene-methylmethacrylate copolymer, mixtures of fluorine-containing resins and styrene copolymers or a silicone resin is preferably used. Particularly, the silicone resin is more preferably used.

Specific examples of the mixtures of fluorine-containing resins and styrene copolymers include a mixture of polyvinylidene fluoride and a styrene-methylmethacrylate copolymer; and a mixture of a polytetrafluoroethylene and a styrene-methylmethacrylate copolymer; a mixture of vinylidene fluoride-tetrafluoroethylene copolymer (10/90 to 90/10), a styrene-acrylate2-ethylhexyl copolymer (10/90 to 90/10) and a styrene-acrylate2-ethylhexyl-methylmethacrylate copolymer (20 to 60/5 to 30/10/50).

Magnetic materials for the carrier core include iron oxides such as ferrite, iron-excess ferrite, magnetite and γ-iron oxide; and metals such as iron, cobalt, nickel and their metal alloys. Specific examples of elements included therein include iron, cobalt, nickel, aluminum, copper, lead, magnesium, tin, zinc, antimony, beryllium, bismuth, calcium, manganese, selenium, titanium, tungsten, vanadium, etc. Copper-zinc-iron ferrite mainly including copper, zinc and iron; and manganese-magnesium-iron ferrite mainly including manganese, magnesium and iron are preferably used.

The carrier preferably has a resistivity of from $10^6$ Ω·cm to $10^{10}$ Ω·cm by controlling the concavities and convexities on the surface thereof an amount of a resin coated thereon.

The carrier preferably has a particle diameter of from 4 μm to 200 μm, more preferably from 10 μm to 150 μm, and much more preferably from 20 μm to 100 μm. Particularly, the resin-coated carrier preferably has a 50% particle diameter of from 20 to 70 μm. The two-component developer preferably includes the toner of the present embodiment in an amount of from 1 part by mass to 200 parts by mass, and more preferably from 2 parts by mass to 50 parts by mass per 100 parts by mass of the carrier.

(Toner Preparation Method)

The method of preparing the toner of the present embodiment includes a droplet forming process discharging a toner constituent liquid obtained by dissolving or dispersing at least a binder resin, a release agent and inorganic fine particles in an organic solvent to form a droplet; and a droplet solidification process solidifying the droplet. Means for executing the method include a droplet former, a droplet conveyance solidifier and a droplet collector, which are respectively explained below.

[Droplet Former]

The droplet former discharges the toner constituent liquid to form a droplet.

The toner constituent liquid is obtained by dissolving or dispersing at least a binder resin, a release agent and inorganic fine particles in an organic solvent.

The organic solvent is not particularly limited if it is volatile and capable of dissolving or dispersing the toner constituents in the toner constituent liquid, and dissolving the binder resin and the release agent therein without a phase separation. For example, organic solvents such as ethers, ketones, esters, hydrocarbons and alcohols are preferably used. Specific examples thereof include, but are not limited to, tetrahydrofuran (THF), acetone, methyl ethyl ketone (MEK), ethyl acetate, toluene and water. These may be used alone or in combination.

In the present disclosure, when ethyl acetate is used as an organic solvent, it is preferable to use a release agent soluble in 100 g of ethyl acetate having a temperature of 45° C. in an amount not less than 70 g, and preferably not less than 200 g.

—Toner Constituent Liquid Preparation Method—

The toner constituent liquid is obtained by dissolving or dispersing the toner constituents in an organic solvent. It is important to finely disperse the dispersed materials such as a colorant with a homomixer or a beads mill relative to an aperture of the nozzle so as not to block discharge holes when preparing the toner constituent liquid.

The toner constituent liquid preferably includes solid contents in an amount of from 3% by mass to 40% by mass. When less than 3% by mass, not only the productivity lowers, but also the dispersed materials such as a colorant tend to precipitate or aggregate and the constituents tend to be ununiform, resulting in deterioration of toner quality. When greater than 40% by mass, the toner may not have a smaller particle diameter.

The process of discharging the toner constituent liquid to form a droplet can be executed by a droplet discharger discharging the droplet.

The toner constituent liquid preferably has a temperature of from 50° C. to 60° C. When less than 50° C., droplets are not instantly dried right after discharged and combined, resulting in undesired particle diameter distribution. When higher than 60° C., the solvent tends to evaporate and a concentration of the solid contents increases, resulting in production of a toner having an undesired particle diameter.

<Droplet Discharger>

The droplet dischargers are not particularly limited if they discharge droplets having a narrow particle diameter distribution, and known droplet dischargers such as a single fluid nozzle, a double fluid nozzle, a film oscillation discharger (disclosed in e.g., Japanese Patent No. JP-5055154-B2), a Rayleigh breakup discharger (disclosed in e.g., Japanese Patent No. JP-4647506-B2), a liquid oscillation discharger (disclosed in e.g., Japanese Patent No. JP-5315920-B2) and a liquid column resonance discharger (disclosed in e.g., Japanese published unexamined application No. JP-2011-212668-A) can be used.

In order to form droplets having a narrow particle diameter distribution and keep productivity of the toner, an oscillation is applied to a liquid in a liquid column resonance liquid chamber plural discharge holes are formed on to form a standing wave by the liquid column resonance and discharge the liquid from the discharge holes formed in an area which is a belly of the standing wave.

<Liquid Column Resonance Discharger>

The liquid column resonance discharger using liquid resonance to discharge droplets is explained.

Figure 2:
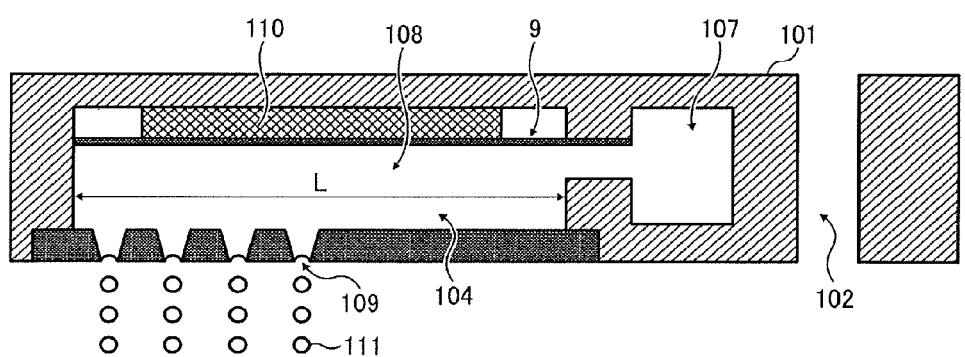
FIG. 2 is a schematic view for illustrating an example of liquid column resonance discharger.

FIG. 2 is a schematic view for explaining an example of liquid column resonance droplet discharger 101. The liquid column resonance droplet discharger 101 includes a common liquid passage 107 and a liquid column resonance liquid chamber 108. The liquid column resonance liquid chamber 108 is connected to the common liquid passage 107 formed on one of wall surfaces at both ends of the chamber in a longitudinal direction. In addition, the liquid column resonance liquid chamber 108 includes a discharge hole 109 at the bottom and an oscillation generator 110 generating a high frequent oscillation on the ceiling. The oscillation generator 110 is not particularly limited if it drives at a specific frequency, but preferably formed of an elastic plate 9 bonded with piezoelectrics. The oscillation generator 110 is connected with an unillustrated high frequency electric source. A numeral 102 is an air flow passage.

A toner constituent liquid 104 is fed by an unillustrated liquid circulation pump, and flown in the common liquid passage 107 through a liquid supply tube to the liquid column resonance liquid chamber 108. Then, in the liquid column resonance liquid chamber 108 filled with the toner constituent liquid 104, a pressure distribution is formed by a liquid column resonance standing wave generated by the oscillation generator 110. A droplet 111 is discharged from the discharge hole 109 located in an area which is a belly of the standing wave having a large amplitude and a large pressure variation. The area which is a belly of the standing wave by the liquid column resonance is an area besides nodes of the standing wave. The area is preferably an area where the pressure variation of the standing wave has an amplitude large enough to discharge the liquid, and more preferably a range of ±¼ wavelength from a position where the amplitude of the pressure standing wave is maximum (a node as a speed standing wave) to a position where it is minimum. Even when plural discharge holes are formed in the area which is a belly of the standing wave, almost uniform droplets can be formed from them, the droplets are effectively discharged, and the discharge holes are less likely to be blocked. The toner constituent liquid 104 having passed the common liquid passage 107 is returned to a material container through an unillustrated liquid return tube. When discharge of the droplets 111 decreases the toner constituent liquid 104 in the liquid column resonance liquid chamber 108, a suction power of the liquid column resonance standing wave in the liquid column resonance liquid chamber 108 increases the toner constituent liquid 104 fed from the common liquid passage 107 to refill the liquid column resonance liquid chamber 108 with the toner constituent liquid 104. When the liquid column resonance liquid chamber 108 is refilled with the toner constituent liquid 104, an amount of the toner constituent liquid 104 passing the common liquid passage 107 is returned to the original.

[Droplet Conveyance Solidifier]

After the droplet of the toner constituent liquid discharged in the air from the droplet discharger is conveyed (droplet conveyor), solidified and collected to obtain the toner of the present embodiment. The droplet conveyor and the droplet solidifier may be combined to solidify the droplet while conveying the droplet. The droplet may be conveyed to the droplet collector after solidified, or may be solidified after collected.

The droplet conveyance solidifier may include an airstream temperature controller.

[Droplet Collector]

The solidified particles can be collected by known powder collectors such as cyclone collectors and back filters from the air.

[Second Drying]

When a toner collected by the droplet collector includes much residual solvent, the toner is subjected to second drying when necessary to decrease the solvent. Known conventional driers such as fluidized bed driers and vacuum dries can be used for second drying. When an organic solvent remains in a toner, not only toner properties such as heat resistant preservability, fixability and chargeability vary, but also the organic solvent volatilizes with heat when the toner is fixed and may badly influence users and peripheral equipment. Therefore, it is preferable the toner is sufficiently dried.

(Toner Housing Unit)

The toner housing unit in the present disclosure is a unit housing a toner.

Embodiments of the toner housing unit include a toner container, an image developer and a process cartridge.

The toner container is a container containing a toner.

The image developer is a developing means containing a toner.

The process cartridge includes at least an image bearer and an image developer, detachable from an image forming apparatus, and contains a toner. The process cartridge may further include at least one member selected from the group consisting of a charger, an irradiator and a cleaner.

The image forming apparatus equipped with the toner housing unit is capable of keeping high transferability regardless of the degree of deterioration while deforming the toner until it is cleanable without impairing low-temperature fixability of the toner because of forming images with the toner of the present embodiment.

(Image Forming Method and Image Forming Apparatus)

An image forming method of the present embodiment includes an electrostatic latent image forming process forming an electrostatic latent image on an electrostatic latent image bearer, a developing process developing the electrostatic latent image with the toner or the developer of the present embodiment to form a visible image, a transfer process transferring the visible image onto recording medium, and a fixing process fixing the transferred image transferred onto the recording medium; and further includes other processes appropriately selected depending on the intended purpose, such as a charge-eliminating process, a cleaning process, a recycling process, and a controlling process when necessary.

An image forming apparatus of the present embodiment includes: at least an electrostatic latent image bearer; a charging unit to charge the surface of the electrostatic latent image bearer; an exposing unit to expose the charged surface of the electrostatic latent image bearer to form an electrostatic latent image; a developing unit to sequentially develop the electrostatic latent images with a plurality of color toners to form a visible image; a transfer unit to transfer the visible image to form a transferred image on a recording medium; and a fixing unit to fix the transferred image on the recording medium. The image forming apparatus of the present embodiment includes other units appropriately selected depending on the intended purpose, such as a charge-eliminating unit, a cleaning unit, a recycling unit, and a controlling unit.

—Electrostatic Latent Image Forming Process and Electrostatic Latent Image Forming Unit—

The electrostatic latent image forming process is a process of forming an electrostatic latent image on an electrostatic latent image bearer.

A material, a shape, a structure, and a size of the electrostatic latent image bearer (may be referred to as "electrophotographic photoconductor" and "photoconductor") are not particularly limited and may be appropriately selected from known electrostatic latent image bearers. Examples of the shape of the electrostatic latent image bearer include a drum shape. Examples of the material of the electrostatic latent image bearer include an inorganic photoconductor (e.g., amorphous silicon and selenium), and an organic photoconductor (OPC) (e.g., polysilane and phthalopolymethine). Among them, an organic photoconductor (OPC) is preferable because an image with higher fineness can be obtained.

The electrostatic latent image can be formed by an electrostatic latent image forming unit, where the electrostatic latent image forming unit uniformly charges the surface of the electrostatic latent image bearer, followed by imagewise exposing.

The electrostatic latent image forming unit includes: at least a charging unit (charging device) to uniformly charge the surface of the electrostatic latent image bearer; and an exposing unit (exposing device) to imagewise expose the surface of the electrostatic latent image bearer.

For example, the charging can be performed by applying a voltage to a surface of the electrostatic latent image bearer using the charging device.

The charging device is not particularly limited and may be appropriately selected depending on the intended purpose. Examples of the charging device include known contact charging devices, equipped with an electroconductive or semiconductive roller, brush, film, or rubber blade, and a non-contact charging device utilizing corona discharge, such as corotron and scorotron.

It is preferred that the charging device be provided in contact with the electrostatic latent image bearer, or in non-contact with the electrostatic latent image bearer, and the surface of the electrostatic latent image bearer be charged by applying superimposed AC voltage and DC voltage.

Moreover, it is preferred that the charging device be charging roller disposed adjacent to the electrostatic latent image bearer in a non-contact manner via a gap tape, and configured to charge the surface of the electrostatic latent image bearer by applying superimposed AC voltage and DC voltage to the charging roller.

The exposure can be performed by imagewise exposing the surface of the electrostatic latent image bearer using the exposing device.

The exposing device is not particularly limited and may be appropriately selected depending on the intended purpose, so long as it can imagewise expose the surface of the electrostatic latent image bearer charged by the charging device. Examples of the exposing device include various exposure devices, such as a copy optical system, a rod lens array system, a laser optical system, and a crystal shutter optical system.

Note that, in the present disclosure, a back side system may be employed, where the back side system means that imagewise exposure is performed from the back side of the electrostatic latent image bearer.

—Developing Process and Developing Unit—

The developing process is a process of developing the electrostatic latent image using the toner, to form a visible image.

The visible image can be formed by the developing unit, for example, by developing the electrostatic latent image using the toner.

The developing unit suitably contains at least, for example, a developing device that stores the toner, and configured to apply the toner to the electrostatic latent image in a contact or non-contact manner. A developing device including a container with the toner is more preferable.

The developing unit may be a developing unit for a single color, or a developing unit for multicolor. Examples of the developing device include a developing device containing a stirring device configured to stir the toner by friction to be charged and a rotatable magnetic-roller.

In the developing unit, toner particles and carrier particles are stirred and mixed so that the toner particles are charged by friction generated therebetween. The charged toner particles are retained in the chain-like form on the surface of the rotating magnetic roller to form magnetic brushes. The magnetic roller is disposed near the electrostatic latent image developing member (photoconductor), and thus some of the toner particles that form the magnetic brushes formed on the surface of the magnet roller are transferred onto the surface of the electrostatic latent image developing member (photoconductor) by the action of electrically attractive force. As a result, the electrostatic latent image is developed with the toner particles to form a visible image on the surface of the electrostatic latent image developing member (photoconductor).

—Transfer Process and Transfer Unit—

The transfer process is a process of transferring the visible image onto a recording medium. The transfer process is preferably an aspect where an intermediate transfer member is used to primarily transfer a visible image onto the intermediate transfer member, to secondarily transfer the thus-transferred visible image onto the recording medium. The transfer process is more preferably an aspect including a primary transfer process and a secondary transfer process, where the primary transfer process is a process of transferring a visible image onto an intermediate transfer member using two or more toners, preferably toners of full colors, to form a composite transfer image, and the secondary transfer process is a process of transferring the composite transfer image onto a recording medium.

The transferring can be performed by the transfer unit, for example, by charging the visible image on the electrostatic latent image bearer (photoconductor) using a transfer charger. Examples of the transfer unit include an aspect including a primary transfer unit and a secondary transfer unit, where the primary transfer unit is configured to transfer a visible image onto an intermediate transfer member to form a composite transfer image, and the secondary transfer unit is configured to transfer the composite transfer image on a recording medium.

Note that, the intermediate transfer member is not particularly limited and may be appropriately selected from known transfer members depending on the intended purpose. Examples of the intermediate transfer member suitably include a transfer belt.

The transfer unit (the primary transfer unit and the secondary transfer unit) preferably includes at least a transfer device configured to charge the visible images formed on the electrostatic latent image developing member (photoconductor) onto the recording medium to be transferred onto the recording medium. The number of the transfer unit may be one, or two or more.

Examples of the transfer device include a corona transfer device employing corona discharge, a transfer belt, a transfer roller, a pressing transfer roller, and an adhesive transferring device.

The recording medium is not particularly limited and may be appropriately selected from known recording medium (recording paper).

—Fixing Process and Fixing Unit—

The fixing process is a process of fixing a visible image transferred on recording medium by a fixing device. The fixing process may be performed every time when an image of each color toner is transferred onto the recording medium, or the fixing process may be performed at one time in a state that images of color toners are superposed.

The fixing device is not particularly limited and may be appropriately selected depending on the intended purpose, but it is preferably a known heating-pressurizing unit. Examples of the heating-pressurizing unit include a combination of a heat roller and a press roller, and a combination of a heat roller, a press roller, and an endless belt.

The fixing device includes: a heating member containing a heat generating element; a film configured to contact with the heating member; and a pressurizing member configured to be pressed against the heating member via the film. The fixing device is preferably a unit configured to pass recording medium on which an unfixed image is formed between the film and the pressurizing member, to fix the recording medium with heat. The heating-pressurizing unit usually performs heating preferably at a range of from 80° C. through 200° C.

Note that, in the present disclosure, known photofixing devices may be used instead of or in addition to the fixing process and the fixing unit depending on the intended purpose. The charge-eliminating process is a process of applying a charge-eliminating bias to the electrostatic latent image bearer, to eliminate charge, and can be performed by a charge-eliminating unit.

The charge-eliminating unit is not particularly limited and may be appropriately selected from known charge-eliminating devices depending on the intended purpose, so long as it apply a charge-eliminating bias to the electrostatic latent image bearer. Examples of the charge-eliminating unit include a charge-eliminating lamp.

The cleaning process is not particularly limited so long as it can remove the toner remaining on the electrostatic latent image bearer, and can be suitably performed by a cleaning unit.

The cleaning process is not particularly limited and may be appropriately selected from known cleaners so long as it can remove the toner reaming on the electrostatic latent image bearer. Examples of the cleaning unit include a magnetic brush cleaner, an electrostatic brush cleaner, a magnetic roller cleaner, a blade cleaner, a brush cleaner, and a web cleaner.

The recycling process is a process of recycling the toner removed by the cleaning process to the developing unit, and can be suitably performed by a recycling unit. The recycling unit is not particularly limited. Examples of the recycling unit include known conveying units.

The controlling process is a process of control each of the above processes, and each of the processes can be suitably performed by a controlling unit.

The controlling unit is not particularly limited and may be appropriately selected depending on the intended purpose, so long as it can control each of the above units. Examples of the controlling unit include devices such as a sequencer and a computer.

Figure 4:
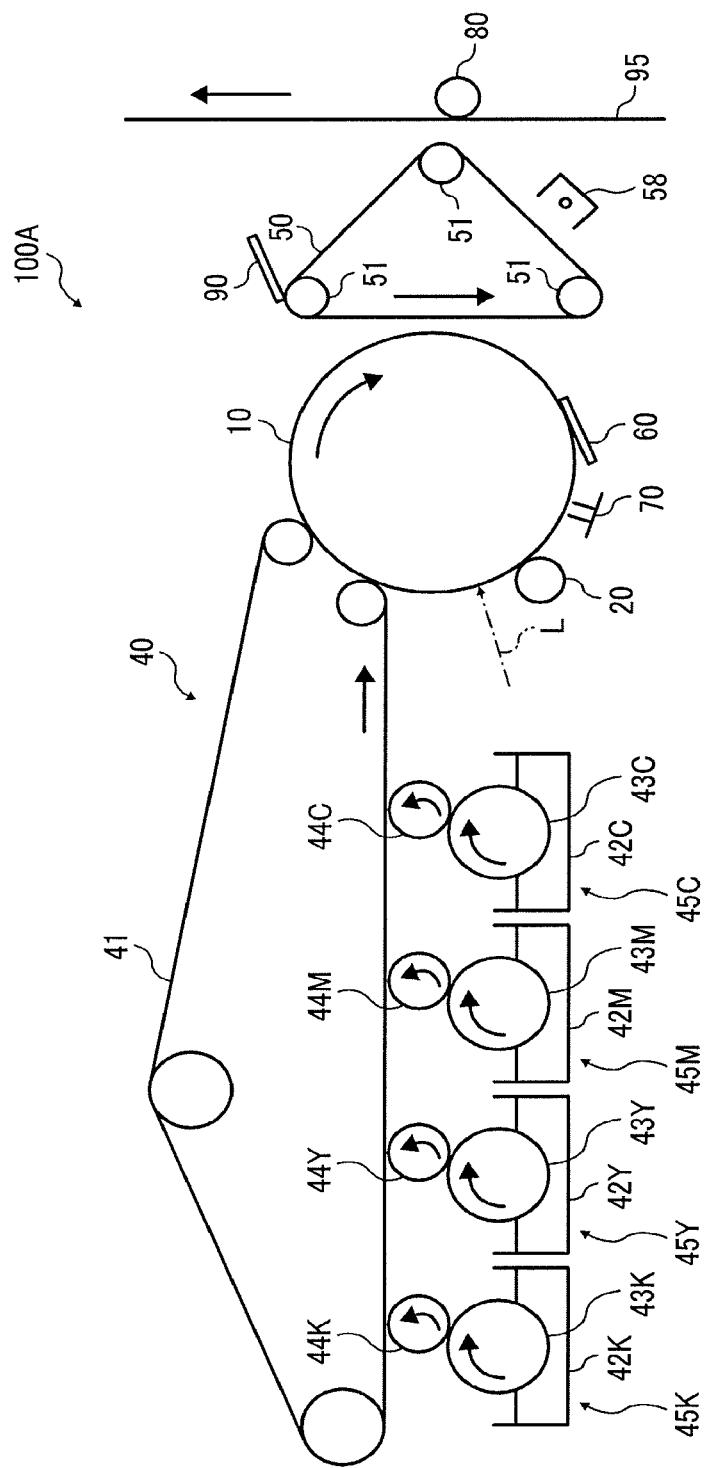
FIG. 4 is a schematic view illustrating an embodiment of the image forming apparatus of the present invention.

FIG. 4 is a schematic view illustrating an embodiment of the image forming apparatus of the present embodiment. An image forming apparatus 100A includes a photoconductor drum 10, a charging roller 20, an exposing device, a developing device 40, an intermediate transfer belt 50, a cleaning device 60 containing a cleaning blade, and a charge-eliminating lamp 70.

The intermediate transfer belt 50, which is an endless belt, is stretched around three rollers 51 disposed in the belt, and is movable in a direction indicated by the arrow of the figures. A part of three rollers 51 also functions as a transfer bias roller that can apply a transfer bias (primary transfer bias) to the intermediate transfer belt 50. Near the intermediate transfer belt 50, a cleaning device 90 including a cleaning blade is disposed. Also, a transfer roller 80 that can apply a transfer bias (secondary transfer bias) onto a transfer paper 95 configured to transfer a toner image is disposed facing the intermediate transfer belt 50.

Around the intermediate transfer belt 50, a corona charging device 58 configured to apply a charge to the toner image transferred on the intermediate transfer belt 50 is disposed between a contact portion of the photoconductor drum 10 with the intermediate transfer belt 50 and a contact portion of the intermediate transfer belt 50 with the transfer paper 95 in a rotational direction of the intermediate transfer belt 50.

The developing device 40 is composed of a developing belt 41; and a black developing unit 45K, a yellow developing unit 45Y, a magenta developing unit 45M, and a cyan developing unit 45C, which are disposed around the developing belt 41. A developing unit 45 for each color includes a developer storage unit 42, a developer supplying roller 43, and a developing roller 44 (developer bearing member). Moreover, the developing belt 41, which is an endless belt, is stretched around a plurality of rollers, and is movable in a direction indicated by the arrow of the figures. A part of the developing belt 41 contacts with the photoconductor drum 10.

Next, a method for forming an image using the image forming apparatus 100A will be described hereinafter. The surface of the photoconductor drum 10 is uniformly charged by the charging roller 20. Then, the exposing device (not illustrated) exposes the surface of the photoconductor drum 10 to light, to form an electrostatic latent image. Next, the electrostatic latent image formed on the photoconductor drum 10 is developed using the toner supplied from a developer from the developing device 40, to form a toner image. The toner image formed on the photoconductor drum 10 is transferred (primarily transferred) onto the intermediate transfer belt 50, and is further transferred (secondary transferring) onto the transfer paper 95 by a transfer bias applied from the transfer roller 80. Meanwhile, a residual toner remaining on the surface of the photoconductor drum 10, in which the toner image is transferred to the intermediate transfer belt 50, is removed by the cleaning device 60, and a charge on the surface of the photoconductor drum 10 is eliminated by the charge-eliminating lamp 70.

Figure 5:
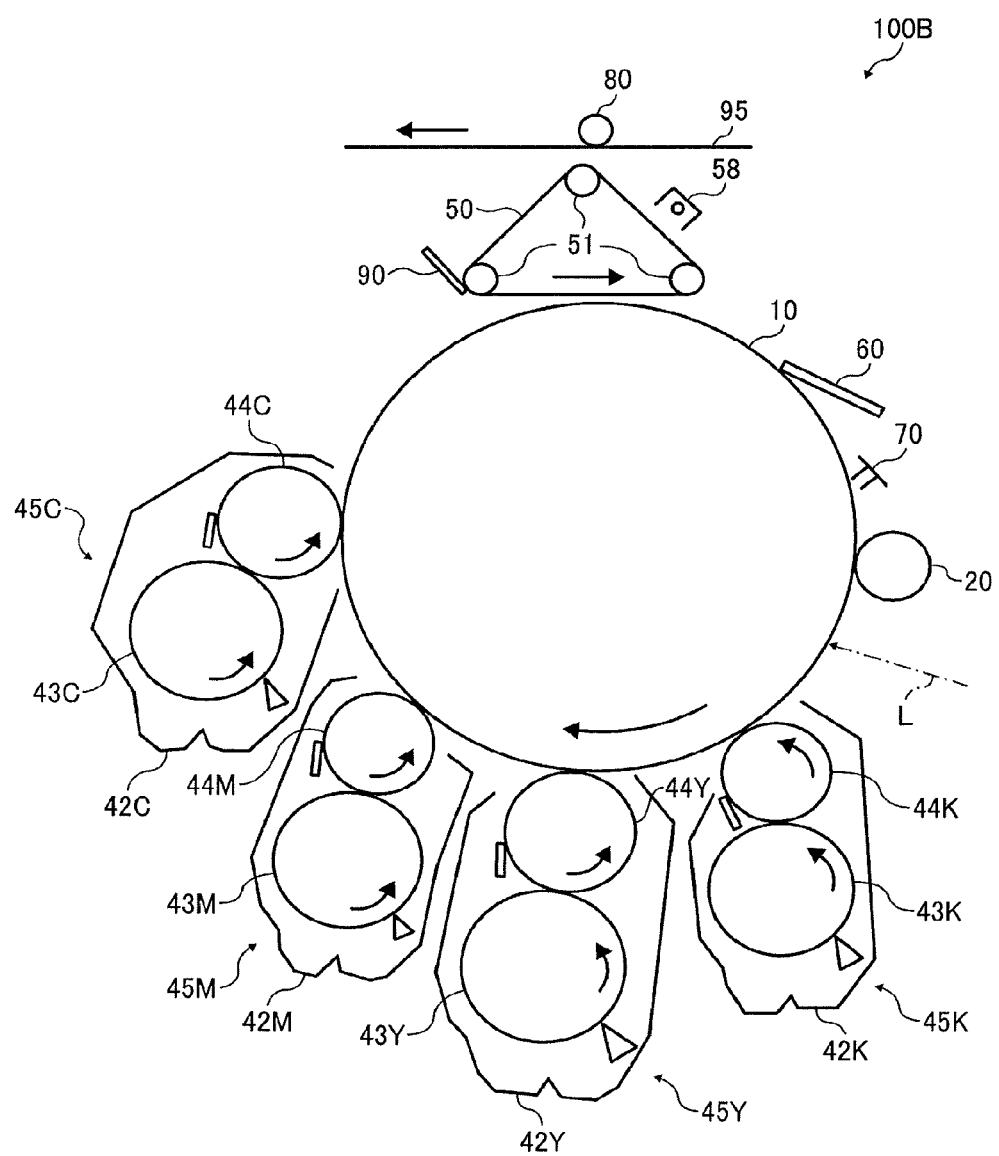
FIG. 5 is a schematic view illustrating another embodiment of the image forming apparatus of the present invention.

FIG. 5 is a schematic view illustrating another embodiment of the image forming apparatus of the present embodiment. An image forming apparatus 100B has the same configuration as the image forming apparatus 100A, except that the developing belt 41 is not disposed, and that the black developing unit 45K, the yellow developing unit 45Y, the magenta developing unit 45M, and the cyan developing unit 45C are disposed directly facing the periphery of the photoconductor drum 10.

Figure 6:
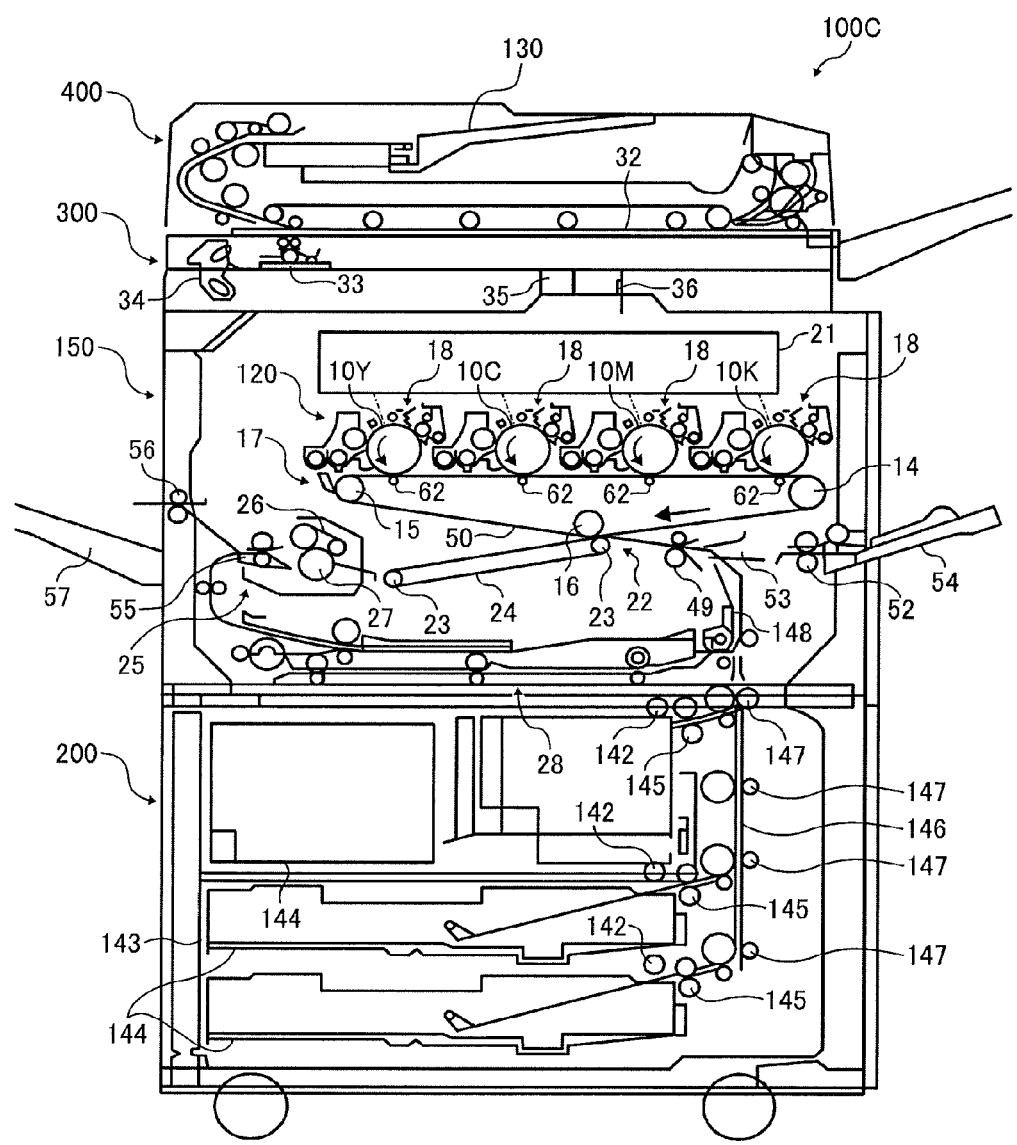
FIG. 6 is a schematic view illustrating a further embodiment of the image forming apparatus of the present invention.
Figure 7:
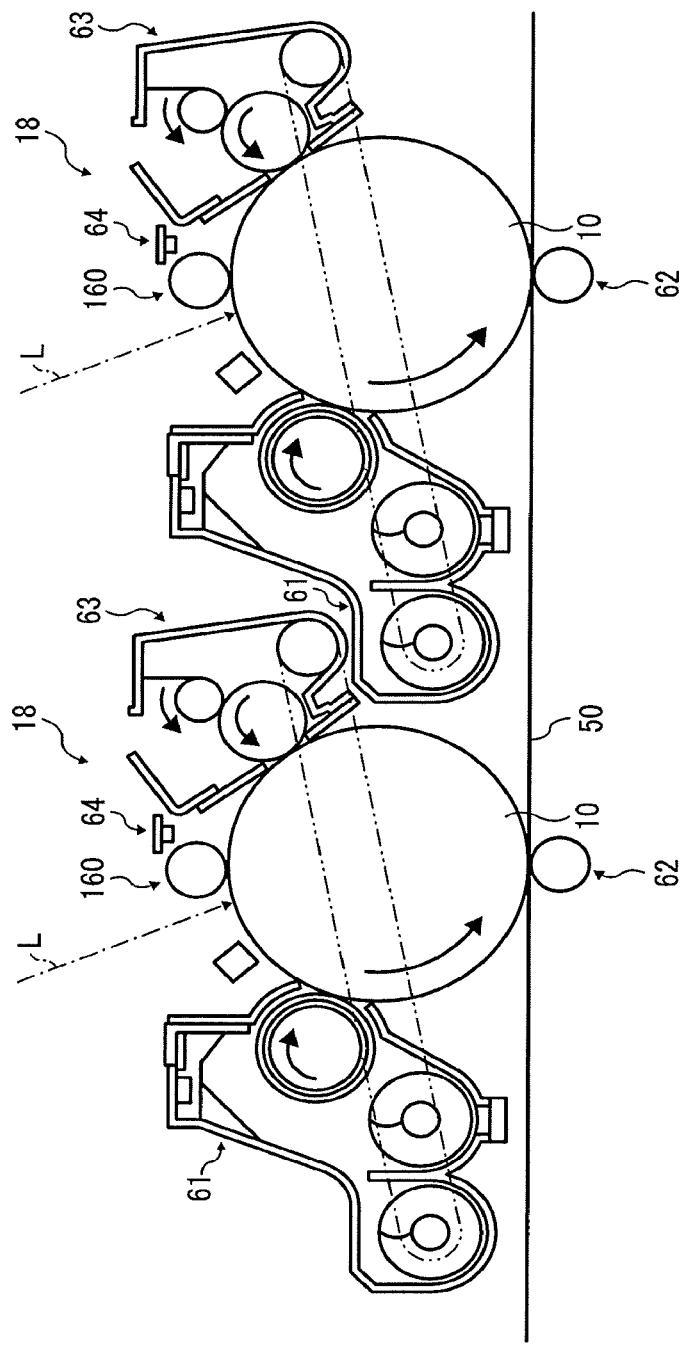
FIG. 7 is a schematic view illustrating another embodiment of the image forming apparatus of the present invention.

FIG. 6 is a schematic view illustrating a further embodiment of the image forming apparatus of the present embodiment. The image forming apparatus 100C is a tandem color image forming apparatus, and includes a copying device main body 150, a paper feeding table 200, a scanner 300, and an automatic document feeder (ADF) 400.

An intermediate transfer belt 50, which is an endless belt type, is disposed at a central part of the copying device main body 150. The intermediate transfer belt 50 is stretched around three rollers 14, 15, and 16, and can rotate in the direction indicated by the arrow in figures. Near the roller 15, a cleaning device 17 including a cleaning blade is disposed, and is configured to remove a residual toner on the intermediate transfer belt 50 in which the toner image is transferred to the recording paper. Image forming units for four colors (yellow, cyan, magenta, and black) 10Y, 10C, 10M, and 10K are aligned in the conveying direction so as to face the intermediate transfer belt 50 stretched around rollers 14 and 15.

Near the image forming unit 120, an exposing device 21 is disposed. Moreover, a secondary transfer belt 24 is disposed opposite to a side where the image forming unit 120 of the intermediate transfer belt 50 is disposed. The secondary transfer belt 24, which is an endless belt, is stretched around a pair of rollers 23. The recording paper conveyed on the secondary transfer belt 24 and the intermediate transfer belt 50 can contact each other between the roller 16 and the roller 23.

Near the secondary transfer belt 24, a fixing device 25 is disposed. The fixing device 25 includes a fixing belt 26 and a press roller 27, where the fixing belt 26, which is an endless belt, is stretched around a pair of rollers, and the press roller 27 is disposed so as to be pressed against the fixing belt 26. Here, a sheet inverting device 28 configured to invert the recording paper is disposed near the secondary transfer belt 24 and the fixing device 25, in order to form an image on both sides of the recording paper.

Next, a method for forming a full-color image using the image forming apparatus 100C will be described hereinafter. First, a color document is set on a document table 130 of the automatic document feeder (ADF) 400, or the automatic document feeder 400 is opened to set the color document on a contact glass 32 of the scanner 300, and the automatic document feeder 400 is closed. When a start button is pushed, in the case where the color document has been set on the automatic document feeder 400, the color document is conveyed and transferred to the contact glass 32, and then the scanner 300 activates. Meanwhile, in the case the color document has been set on the contact glass 32, the scanner 300 activates immediately after that. Then, a first travelling body 33 including a light source and a second travelling body 34 including a mirror travel. At this time, the first travelling body 33 irradiates the document with light to form reflected light, the reflected light is reflected at the second travelling body 34, and then the reflected light is received at a reading sensor 36 through an imaging forming lens 35. Thus, the color document is read, to obtain black, yellow, magenta and cyan image information.

Each image information is transmitted to the image forming unit 120 for each color, to form a toner image for each color. As illustrated in FIG. 5, the image forming unit 120 for each color includes: a photoconductor drum 10; a charging roller 160 configured to uniformly charge the photoconductor drum 10; an exposing device configured to expose the photoconductor drum 10 to exposing light L based on image information for each color, to form an electrostatic latent image corresponding to form a color image; a developing device 61 configured to develop the electrostatic latent image with the toner for each color, to form a toner image of each of the color toners; a transfer roller 62 configured to transfer the toner image on the intermediate transfer belt 50; a cleaning device 63 including a cleaning blade; and a charge-eliminating lamp 64.

The toner image for each color formed on the image forming unit 120 for each color is transferred (primarily transferred), and are superposed on top of one another on an intermediate transfer member 50, which is stretched around rollers 14, 15, and 16, and is movable, to form a composite color image.

Meanwhile, on the paper feeding table 200, one of paper feeding rollers 142 is selectively rotated to feed a recording paper from one of the paper feeding cassettes 144 equipped in multiple stages in a paper bank 143. The sheet is separated one by one by a separation roller 145 and sent to a paper feeding path 146. The recording paper is conveyed by a conveying roller 147 and is guided to a paper feeding path 148 in the copying device main body 150, and stops by colliding with a registration roller 49. Alternatively, the paper feeding roller 142 is rotated to feed a recording paper on a manual feed tray 54. The recording paper is separated one by one by a separation roller 52 and is guided to a manual paper feeding path 53, and stops by colliding with the registration roller 49.

Note that, the registration roller 49 is generally used so as to be grounded, but it may also be used in a state that a bias is being applied for removing paper dust particles on the recording medium. Next, the registration roller 49 is rotated in accordance with the timing of the composite toner image formed on the intermediate transfer belt 50, the recording paper is fed to between the intermediate transfer belt 50 and the secondary transfer belt 24, to transfer (secondarily transfer) the composite toner image on the recording medium. Notably, a residual toner remaining on the intermediate transfer belt 50, in which the composite toner is transferred thereto, is removed by the cleaning device 17.

The recording medium on which the composite toner image is transferred is conveyed by the secondary transfer belt 24, and then the composite toner image is fixed by the fixing device 25. Next, a conveying path is switched by a switching claw 55, and the recording medium is discharged in a paper ejection tray 57 by a discharge roller 56. Alternatively, a conveying path is switched by the switching claw 55, and the recording medium is inverted by the inverting device 28, to form an image on the rear surface of the recording medium. Then the recording medium is discharged in the paper ejection tray 57 by the discharge roller 56.

EXAMPLES

Having generally described this invention, further understanding can be obtained by reference to certain specific examples which are provided herein for the purpose of illustration only and are not intended to be limiting. In the descriptions in the following examples, the numbers represent mass ratios in parts or %, unless otherwise specified.

Example 1

(Preparation of Toner 1)
—Preparation of Colorant Dispersion—
First, a carbon black dispersion was prepared.
Twenty (20) parts of carbon black (Regal 1400 from Cabot Corp.), 2 parts of a pigment dispersant (AJISPER PB821 from Ajinomoto Fine-Techno Co., Inc.) and 78 parts of ethylacetate were primarily dispersed by a mixer having a stirring blade to prepare a primary dispersion. The primary dispersion was further dispersed with higher shearing strength by a dyno-mill to prepare a secondary dispersion completely free from aggregates. Further, the secondary dispersion was passed through a filter made of polytetrafluoroethylene (PTFE) (fluorinert membrane filter FHLP09050 from Nihon Millipore Kogyo K. K. having a pore size of 0.45 µm to prepare a sub-micron carbon black dispersion.

—Preparation of Toner Constituent Liquid—

Six hundred seventy-six point seven (676.7) parts of ethyl acetate, 20 parts of ester wax having a melting point of 70.5° C. [WAX1] from Sanyo Chemical Industries, Ltd. as a release agent, 18 parts of an organo silica sol MEK-ST-UP having a concentration of solid contents (ER) of 20% and an average primary particle diameter of 15 nm [Inorganic Fine Particle A] from Nissan Chemical Industries, Ltd. as an inorganic fine particle dispersion, 2 parts of a polyethylene release agent grafted with a styrene-butylacrylate copolymer as a release agent dispersant, and 263.3 parts of a binder resin formed of a terephthalic acid, an isophthalic acid, a succinic acid, ethylene glycol and neopentyl glycol, having a weight-average molecular weight of 24,000 and a Tg of 65° C. [Polyester Resin A] were mixed and dissolved by a mixer having a stirring blade at 70° C. The [WAX1] and the [Polyester Resin A] were transparently dissolved in ethyl acetate without phase separation. After dissolved, the mixed liquid was cooled to have a temperature of 55° C., and 100 parts of the carbon black dispersion were mixed therewith and stirred for 10 min to prepare a toner constituent liquid.

A weight-average molecular weight (Mw) of the binder resin was measured by a GPC measurer GPC-150C from Waters Corp. KF801 to 807 from Shodex were used as columns and an RI (refraction index) detector is used as the detector. Ethyl acetate has a boiling point of 76.8° C.

—Preparation of Toner—

A droplet of the toner constituent liquid was discharged by a toner preparation apparatus having a droplet discharge head as a droplet discharger under the following conditions. After discharged, the droplet was dried and solidified by a droplet solidifier using a dry nitrogen. After collected by cyclone, the solidified droplet was further dried by air blow at 35° C. and 90% RH for 48 hrs, and 40° C. and 50% RH for 24 hrs to prepare an intermediate toner base particle. The intermediate toner base particle is further dried under the following conditions to obtain a toner base particle.

The toner was continuously prepared for 6 hrs without blocking of the discharge holes.

[Toner Preparation Conditions]

A length L of liquid column resonance liquid chamber: 1.85 mm
   in a longitudinal direction
   An opening of discharge hole: Diameter of 8.0 µm
   Droplet discharge portion temperature: 40° C.
   Drying temperature (nitrogen): 60° C.
   Ethyl acetate relative humidity (in nitrogen stream): 8%
   Drive frequency: 340 kHz
   Voltage applied to piezoelectrics: 10.0 V —Mixing External Additive—

Next, 100 parts of the toner base particle were mixed with 2.8 parts of a marketed silica fine powder NAX50 having an average primary particle diameter of 30 nm from Nippon Aerosil Co., Ltd. and 0.9 parts of H20TM having an average primary particle diameter of 20 nm from Clariant by a Henschel mixer. Next, the mixture was sifted with a screen having an opening of 60 µm to remove coarse particles and aggregates from the mixture. This, a [toner 1] was obtained.

Example 2

(Preparation of Toner 2)

The procedure for preparation of the toner 1 in Example 1 was repeated except for changing the drying temperature (nitrogen) to 65° C. to prepare a [toner 2].

Example 3

(Preparation of Toner 3)

The procedure for preparation of the toner 1 in Example 1 was repeated except for changing the drying temperature (nitrogen) to 55° C. to prepare a [toner 3].

Example 4

(Preparation of Toner 4)

The procedure for preparation of the toner 1 in Example 1 was repeated except for changing the drying temperature (nitrogen) to 70° C. to prepare a [toner 4].

Example 5

(Preparation of Toner 5)

The procedure for preparation of the toner 1 in Example 1 was repeated except for changing the additive amount of the release agent to 40 parts to prepare a [toner 5].

Example 6

(Preparation of Toner 6)

The procedure for preparation of the toner 1 in Example 1 was repeated except for changing the additive amount of the release agent to 5 parts to prepare a [toner 6].

Example 7

(Preparation of Toner 7)

The procedure for preparation of the toner 1 in Example 1 was repeated except for replacing the [Inorganic Fine Particle A] with an organo silica sol MEK-ST-L having a concentration of solid contents (ER) of 20% and an average primary particle diameter of 40 nm [Inorganic Fine Particle B] from Nissan Chemical Industries, Ltd.) to prepare a [toner 7].

Comparative Example 1

(Preparation of Toner 8)

The procedure for preparation of the toner 1 in Example 1 was repeated except for replacing the [Inorganic Fine Particle A] with an organo silica sol MEK-ST-2040 having a concentration of solid contents (ER) of 20% and an average primary particle diameter of 70 nm [Inorganic Fine Particle C] from Nissan Chemical Industries, Ltd. to prepare a [toner 8].

Comparative Example 2

(Preparation of Toner 9)

—Synthesis of Organic Fine Particle Emulsion—

Six hundred eighty-three (683) parts of water, 11 parts of a sodium salt of an adduct of a sulfuric ester with ethyleneoxide methacrylate (ELEMINOL RS-30 from Sanyo Chemical Industries, Ltd.), 80 parts of styrene, 83 parts of methacrylate, 110 parts of butylacrylate, 12 parts of N-butyl thioglycolate and 1 part of persulfate ammonium were mixed in a reactor vessel including a stirrer and a thermometer, and the mixture was stirred for 15 min at 400 rpm to prepare a white emulsion therein. The white emulsion was heated to have a temperature of 75° C. and reacted for 5 hrs. Further, 30 parts of an aqueous solution of persulfate ammonium having a concentration of 1% by weight were added thereto and the mixture was aged for 5 hrs at 75° C. to prepare an aqueous dispersion a [fine particle dispersion 1] of a vinyl resin (a copolymer of a sodium salt of an adduct of styrene-methacrylate-butylacrylate-sulfuric ester with ethyleneoxide methacrylate).

A volume-average of the [fine particle dispersion 1] was 120 nm when measured by a laser diffraction particle diameter distribution measurer LA-920 from Shimadzu Corp. A part of the [fine particle dispersion 1] was dried to isolate a resin component therefrom. The resin component had a Tg of 72° C. and a weight-average molecular weight of 30,000.

—Preparation of Aqueous Phase—

Nine hundred ninety (990) parts of water, 83 parts of the [fine particle dispersion 1], 37 parts of an aqueous solution of sodium dodecyldiphenyletherdisulfonate having a concentration of 48.5% by weight (ELEMINOL MON-7 from Sanyo Chemical Industries, Ltd.) and 90 parts of ethyl acetate were mixed and stirred to prepare a lacteous liquid an [aqueous phase 1].

—Synthesis of Low-Molecular-Weight Polyester—

Two hundred twenty-nine (229) parts of an adduct of bisphenol A with 2 moles of ethyleneoxide, 529 parts of an adduct of bisphenol A with 3 moles of propyleneoxide, 208 parts terephthalic acid, 46 parts of adipic acid and 2 parts of dibutyltinoxide were reacted in a reactor vessel including a cooling pipe, a stirrer and a nitrogen inlet pipe for 8 hrs at a normal pressure and 230° C. Further, after the mixture was depressurized to 10 to 15 mm Hg and reacted for 5 hrs, 44 parts of trimellitic acid anhydride were added thereto and the mixture was reacted for 2 hrs at a normal pressure and 180° C. to prepare a [low-molecular-weight polyester 1].

The [low-molecular-weight polyester 1] had a number-average molecular weight of 2,500, a weight-average molecular weight of 6,700, a Tg of 43° C. and an acid value of 25 mg KOH/g.

—Synthesis of Intermediate Polyester—

Six hundred eighty-two (682) parts of an adduct of bisphenol A with 2 moles of ethyleneoxide, 81 parts of an adduct of bisphenol A with 2 moles of propyleneoxide, 283 parts terephthalic acid, 22 parts of trimellitic acid anhydride and 2 parts of dibutyltinoxide were mixed and reacted in a reactor vessel including a cooling pipe, a stirrer and a nitrogen inlet pipe for 8 hrs at a normal pressure and 230° C. Further, after the mixture was depressurized to 10 to 15 mm Hg and reacted for 5 hrs to prepare an [intermediate polyester 1]. The [intermediate polyester 1] had a number-average molecular weight of 2,100, a weight-average molecular weight of 9,500, a Tg of 55° C. and an acid value of 0.5 mg KOH/g and a hydroxyl value of 51 mg KOH/g.

Next, 410 parts of the [intermediate polyester 1], 89 parts of isophoronediisocyanate and 500 parts of ethyl acetate were reacted in a reactor vessel including a cooling pipe, a stirrer and a nitrogen inlet pipe for 5 hrs at 100° C. to prepare a [prepolymer 1]. The [prepolymer 1] included a free isocyanate in an amount of 1.53% by mass.

—Synthesis of Ketimine—

One hundred seventy (170) parts of isophorone diamine and 150 parts of methyl ethyl ketone were reacted at 50° C. for 5 hrs in a reaction vessel including a stirrer and a thermometer to prepare a [ketimine compound 1]. The [ketimine compound 1] had an amine value of 418.

—Preparation of Masterbatch (MB)—

One thousand and two hundred (1,200) parts of water, 540 parts of carbon black Printex 35 from Degussa A.G. having a DBP oil absorption of 42 ml/100 mg and a pH of 9.5, 1,200 parts of a polyester resin RS801 from Sanyo Chemical Industries, Ltd. were mixed by a Henschel Mixer from Mitsui Mining Co., Ltd. After the mixture was kneaded by a two-roll mill having a surface temperature of 150° C. for 30 min, the mixture was extended by applying pressure, cooled and pulverized by a pulverizer to prepare a [Bk masterbatch 1].

—Preparation of Oil Phase—

Five hundred (500) parts of the [low-molecular-weight polyester 1], 30 parts of carnauba wax and 850 parts of ethyl acetate were mixed in a reaction vessel including a stirrer and a thermometer. The mixture was heated to have a temperature of 80° C. while stirred. After the temperature of 80° C. was maintained for 5 hrs, the mixture was cooled to have a temperature of 30° C. in an hour. Then, the wax therein was dispersed by a beads mill (Ultra Visco Mill from IMECS CO., LTD.) for 3 passes under the following conditions:

liquid feeding speed of 1 kg/hr; peripheral disc speed of 6 m/sec; and filling zirconia beads having diameter of 0.5 mm for 80% by volume.

Next, 110 parts of [Bk masterbatch 1] and 500 parts of ethyl acetate were mixed for 1 hr to prepare a [Bk material solution].

Nine hundred (900) parts of the [Bk material solution] were transferred into a vessel, 50 parts of ethyl acetate and 165 parts of methyl ethyl ketone (MEK) were added thereto, and the mixture was dispersed by the beads mill for 3 passes under the following conditions to prepare a [Bk Pigment·Wax Dispersion]:

liquid feeding speed of 1 kg/hr; peripheral disc speed of 8 m/sec; and filling zirconia beads having diameter of 0.5 mm for 80% by volume.

Twenty-five (25) parts of inorganic fine particles organo silica sol MEK-ST-UP having a concentration of solid contents (ER) of 20% and an average primary particle diameter of 15 nm from Nissan Chemical Industries, Ltd. were mixed with 100 parts of the [Bk Pigment·Wax Dispersion] by TK homomixer at 6,500 rpm for 10 min to prepare a [Bk oil phase].

—Emulsification, Desolvating, and Toner Particle Deformation—

One hundred twenty (120) parts of the [Bk oil phase], 20 parts of the [prepolymer 1] and 1.2 parts of the [ketimine compound 1] were mixed to prepare a [prepared liquid of resin and colorant 1]. One hundred fifty (150) parts of the [prepared liquid of resin and colorant 1] were mixed with 200 parts of the [aqueous phase 1] by TK homomixer (from PRIMIX Corp.) at 12,000 rpm and 25° C. for 1 min to prepare an emulsified dispersion (1). The [Bk oil phase] is preferably emulsified within 12 hrs after prepared.

One hundred (100) parts of the emulsified dispersion (1) were transferred into a stainless flask with helical ribbon triple stirring blades, ethyl acetate was removed from the emulsion until a concentration thereof became 5% at 25° C. for 6 hrs under reduced pressure (10 kPa) while stirred at 60 rpm to prepare an emulsified dispersion (Y-1).

After 3.1 parts of carboxy methyl cellulose Serogen HH from DKS Co., Ltd. were added to the emulsified dispersion (Y-1) to increase viscosity thereof, ethyl acetate was removed from the emulsion until a concentration thereof became 3% under reduced pressure (10 kPa) while stirred at 300 rpm to apply a shearing force thereto. Further, ethyl acetate was removed from the emulsion until a concentration thereof became 1% at 60 rpm to prepare a [dispersion slurry 1]. The emulsion had a viscosity of 25,000 mPa·s after the viscosity thereof was increased.

—Washing and Drying—

After subjecting 100 parts of the [dispersion slurry 1] to filtration under a reduced pressure, the filtered cake was washed and dried as follows.

(1) ion-exchanged water (100 parts) was added to the filtration cake, followed by mixing with a TK Homomixer (at 12,000 rpm for 10 min), and then the mixture was filtrated;

(2) one hundred (100) parts of 0.1% aqueous sodium hydroxide solution was added to the filtration cake obtained in (1), followed by mixing with a TK Homomixer (at 12,000 rpm for 30 min), and then the resultant mixture was filtrated under a reduced pressure;

(3) one hundred (100) parts of 0.1% by weight hydrochloric acid was added to the filtration cake obtained in (2), followed by mixing with a TK Homomixer (at 12,000 rpm for 10 min) and then the mixture was filtrated;

(4) ion-exchanged water (300 parts) was added to the filtration cake obtained in (3), followed by mixing with a TK Homomixer (at 12,000 rpm for 10 min) and then the mixture was filtrated. This operation was repeated again.

(5) ion-exchanged water (100 parts) was added to the filtration cake obtained (4), followed by gradually dropping 20 parts of 1% Futargent F-300 from Neos Co., Ltd as a fluorine-containing compound therein while stirring at 200 rpm, and then the mixture was filtrated under reduced pressure after stirred for 30 min; and (6) the operation in (1) was performed twice to prepare a [filtration cake 1].

Next, the [filtration cake 1] was dried with an air-circulating drier at 45° C. for 48 hrs, and then was caused to pass through a sieve with a mesh size of 75 μm, to thereby obtain a toner base particle.

—Mixing External Additive—

Next, 100 parts of the toner base particle were mixed with 2.8 parts of a marketed silica fine powder NAX50 having an average primary particle diameter of 30 nm from Nippon Aerosil Co., Ltd. and 0.9 parts of H20TM having an average primary particle diameter of 20 nm from Clariant by a Henschel mixer. Next, the mixture was sifted with a screen having an opening of 60 μm to remove coarse particles and aggregates from the mixture. This, a [toner 9] was obtained.

Comparative Example 3

(Preparation of Toner 10)

The procedure for preparation of the toner 1 in Example 1 was repeated except for changing the drying temperature (nitrogen) to 75° C. to prepare a [toner 10].

Comparative Example 4

(Preparation of Toner 11)

The procedure for preparation of the toner 1 in Example 1 was repeated except for changing the drying temperature (nitrogen) to 50° C. to prepare a [toner 11].

According to <Method of Removing External Additive from Toner>, the external additive on the surface of each of the toners 1 to 11 was removed. The Xsurf, BET specific surface area of toner base particle, surface Si quantity, average primary particle diameter of inorganic fine particles detected from a TEM picture of the cross-sectional surface of the toner base particle, amount W of the release agent extracted with n-hexane (extracted amount of the release agent with n-hexane), average circularity of toner, circle-equivalent diameter (Dv, Dn), most frequent diameter, and second peak particle diameter are shown in Table 2.

TABLE 2

| (Unit) | | Inorganic Diameter (nm) | Fine Particle Qty.(part) | Toner Base Particle | | | |
|---|---|---|---|---|---|---|---|
| | | | | Dv(μm) | Dv/Dn (−) | Most frequent diameter (μm) | Second peak diameter (μm) |
| Example 1 | Toner 1 | 15 | 18 | 5.3 | 1.12 | 5.0 | 6.1 |
| Example 2 | Toner 2 | 15 | 18 | 5.2 | 1.12 | 5.0 | 6.3 |
| Example 3 | Toner 3 | 15 | 18 | 5.2 | 1.13 | 4.9 | 6.2 |
| Example 4 | Toner 4 | 15 | 18 | 5.1 | 1.13 | 4.8 | 5.9 |
| Example 5 | Toner 5 | 15 | 18 | 5.2 | 1.12 | 4.9 | 6.0 |
| Example 6 | Toner 6 | 15 | 18 | 5.2 | 1.13 | 5.0 | 6.1 |
| Example 7 | Toner 7 | 40 | 18 | 5.1 | 1.12 | 4.9 | 6.2 |
| Comparative Example 1 | Toner 8 | 70 | 18 | 5.2 | 1.13 | 5.0 | 6.2 |
| Comparative Example 2 | Toner 9 | 15 | 18 | 5.2 | 1.15 | 5.2 | — |
| Comparative Example 3 | Toner 10 | 15 | 18 | 5.3 | 1.12 | 4.9 | 6.2 |
| Comparative Example 4 | Toner 11 | 15 | 18 | 5.1 | 1.12 | 4.8 | 5.9 |

| (Unit) | | Toner Base Particle | | | | |
|---|---|---|---|---|---|---|
| | | Average Circularity (A) (−) | BET Specific Surface Area ($m^2/g$) | Extracted Amount of Release Agent with n-hexane (mg) | Surface Si Quantity (atomic %) | Xsurf(%) |
| Example 1 | Toner 1 | 0.979 | 1.3 | 18 | 16 | 78 |
| Example 2 | Toner 2 | 0.972 | 2.1 | 22 | 13 | 72 |
| Example 3 | Toner 3 | 0.983 | 1.0 | 12 | 24 | 86 |
| Example 4 | Toner 4 | 0.968 | 2.4 | 24 | 12 | 71 |
| Example 5 | Toner 5 | 0.979 | 1.4 | 4 | 15 | 77 |
| Example 6 | Toner 6 | 0.977 | 1.5 | 32 | 15 | 75 |
| Example 7 | Toner 7 | 0.985 | 1.0 | 12 | 23 | 85 |
| Comparative Example 1 | Toner 8 | 0.988 | 0.9 | 10 | 22 | 82 |
| Comparative Example 2 | Toner 9 | 0.966 | 3.0 | 18 | 12 | 75 |
| Comparative Example 3 | Toner 10 | 0.982 | 1.1 | 16 | 10 | 68 |
| Comparative Example 4 | Toner 11 | 0.969 | 2.3 | 15 | 28 | 93 |

—Preparation of Carrier—

The following materials were mixed and dispersed by a homomixer for 20 min to prepare a coating liquid. The coating liquid was coated by a fluidized-bed coater on 1,000 parts of spherical magnetite having a particle diameter of 50 μm to obtain a magnetic carrier.

| | |
|---|---|
| Silicone Resin (Organo Straight Silicone) | 100 |
| Toluene | 100 |
| γ-(2-aminoethyl)aminopropyltrimethoxysilane | 5 |
| Carbon black | 10 |

—Preparation of Two-Component Developer—

Four (4) parts of each of the toners 1 to 11 and 96.0 parts of the magnetic carrier were mixed by a ball mill to prepare two-component developers of Examples 1 to 7 and Comparative Examples 1 to 4.

—Evaluation of Two-Component Developer—

Cleanability, transfer stability and cold offset resistance of each of the two-component developers of Examples 1 to 7 and Comparative Examples 1 to 4 were evaluated as follows. The evaluation results are shown in Table 3.

<<Cleanability>>

Figure 3:
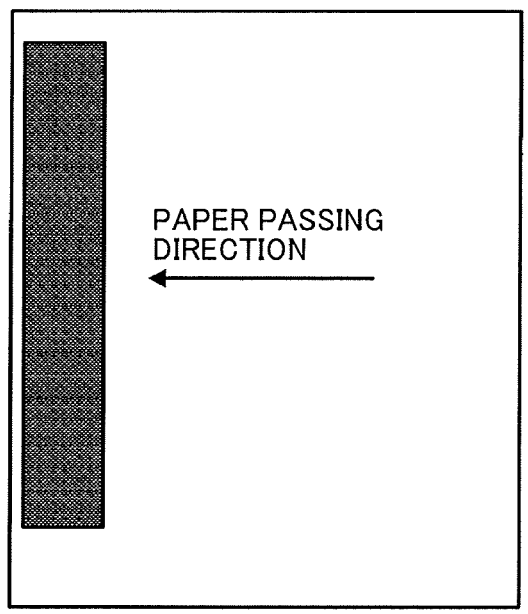
FIG. 3 is a schematic view for illustrating a chart used to evaluate cleanability of toner in examples.

1. The toners and apparatus for use in Examples and Comparative Examples were left in an environmental chamber of 25° C. and 50% Rh for one day;
2. a toner in a PCU (process cartridge unit) installed in RICOH Pro C901 from Ricoh Company, Ltd. was all removed and only a carrier was left in the image developer;
3. 28 g of a sample black toner were placed in the image developer including only the carrier to prepare 400 g of developers having a toner concentration of 7% therein;
4. the PCU was installed in RICOH Pro C901, and only the image developer was idled for 5 min at a developing sleeve linear speed of 300 mm/s;
5. both the developing sleeve and the image bearer were rotated at 300 mm/s in the trailing direction of the rotation direction of the image bearer, and a potential and developing bias were controlled such that a toner on the image bearer had an amount of 0.6±0.05 mg/cm²;
6. the cleaning blade (only one installed in a marketed PCU of RICOH Pro C901) had an elasticity of 70% and a thickness of 2 mm, and contacted the image bearer at an angle of 20° in the counter direction of the rotation direction thereof;
7. a transfer current was controlled such that a rate of transfer was 96±2%;

8. a fibrous tape was located in front of the charging roller to collect a toner after the cleaning process (a toner slipped through the cleaning blade);

9. 1,000 pieces of a chart (FIG. 3) including a bar having a size of 4 cm in a paper feed direction and 25 cm in paper feed width direction were produced; and 10. the toner having adhered to the tape in 8 was weighed to evaluate an amount of the toner slipped through the cleaning blade according to the following criteria.

Good: less than 0.1 g
Fair: less than 0.5 g
Poor: not less than 0.5 g

<<Transfer Stability>>

The developer was set in RICOH Pro C901 from Ricoh Company, Ltd., and 200,000 pieces of a chart having an image areal ratio of 5% were continuously produced on TYPE 6000<70W> papers (A4 T) under an environment of normal temperature and normal humidity (25° C. and 60% RH).

An amount of the toner adhering to the paper was 0.85±0.10 mg/cm$^2$ and the fixing temperature was 140° C.

After 200,000 images were produced, a chart having an image areal ratio of 20% was transferred onto a paper from the photoconductor. An untransferred toner on the photoconductor just before cleaned was transferred onto a white paper with a Scotch Tape (from Sumitomo 3M Ltd.). The image density on the paper was measured by a Macbeth densitometer RD514 and evaluated according to the following criteria.

Good: a difference with a blank was less than 0.010
Fair: a difference with a blank was from 0.011 to 0.02
Poor: a difference with a blank was larger than 0.02

<<Cold Offset Resistance>>

The developer was filled in a marketed copier imagio Neo C600 from Ricoh Company, Ltd. to produce a rectangular image having a size of 3 cm×5 cm and a weight of 0.85 mg/cm2 (determined from weights of the paper before and after the image was formed on) on an A4 size paper (T6000 70 W T from Ricoh Company, Ltd.) at a position 5 cm from the end. The image was fixed at a constant temperature 130° C. of the fixing member and a linear speed of 300 mm/sec. Whether offset was occurred at 130° C. was visually evaluated.

Good: No cold offset
Fair: Cold offset occurred at not more than 3 locations
Poor: Cold offset occurred The overall determination was poor even when only one of the above was poor.

TABLE 3

|  | Toner | Cleanability | Transfer Stability | Cold Offset Resistance | Overall Determination |
|---|---|---|---|---|---|
| Example 1 | Toner 1 | Good | Good | Good | Good |
| Example 2 | Toner 2 | Good | Fair | Good | Good |
| Example 3 | Toner 3 | Fair | Good | Fair | Fair |
| Example 4 | Toner 4 | Good | Fair | Good | Good |
| Example 5 | Toner 5 | Good | Good | Fair | Good |
| Example 6 | Toner 6 | Good | Fair | Good | Good |
| Example 7 | Toner 7 | Fair | Good | Fair | Fair |
| Comparative Example 1 | Toner 8 | Poor | Good | Fair | Poor |
| Comparative Example 2 | Toner 9 | Good | Poor | Good | Poor |
| Comparative Example 3 | Toner 10 | Good | Poor | Good | Poor |
| Comparative Example 4 | Toner 11 | Fair | Fair | Poor | Poor |

Table 3 proves that the toners of Examples 1 to 7 satisfying the ranges of BET specific surface area and Xsurf of the toner base particle specified in the present disclosure have better cleanability and transfer stability than the toners of Comparative Examples 1 to 4.

Having now fully described the invention, it will be apparent to one of ordinary skill in the art that many changes and modifications can be made thereto without departing from the spirit and scope of the invention as set forth therein.

What is claimed is:

1. A toner, comprising:
a toner base particle; and
an external additive,
wherein the toner base particle comprises a binder resin, a release agent, and an inorganic fine particle,
the inorganic fine particle is silica,
an average abundance ratio of the inorganic fine particle at the surface of the toner base particle is from 70% to 90%, and
the toner base particle has a BET specific surface area of from 1.0 m$^2$/g to 2.5 m$^2$/g after the external additive is removed from the toner.

2. The toner of claim 1, wherein the silica is an organosol synthesized by a wet method.

3. The toner of claim 1, wherein the toner base particle has the BET specific surface area of from 1.1 m$^2$/g to 2.0 m$^2$/g after the external additive is removed from the toner.

4. The toner of claim 1, wherein the toner base particle has a surface Si quantity of from 10% by atom to 30% by atom when measured by XPS.

5. The toner of claim 1, wherein the inorganic fine particle detected from a transmission electron microscope photograph of a torn surface of the toner base particle has an average primary particle diameter of from 10 nm to 50 nm.

6. The toner of claim 1, wherein an amount of the release agent abstracted with n-hexane from 1.0 g of the toner is from 5 mg to 30 mg.

7. The toner of claim 1, wherein the toner has an average circularity of from 0.970 to 0.985.

8. The toner of claim 1, wherein a volume-basis particle diameter distribution of the toner has a first peak and a second peak, and a volume-basis particle diameter of the second peak is 1.21 to 1.31 times of a volume-basis particle diameter of the first peak.

9. The toner of claim 1, wherein at least a part of the inorganic fine particle is not exposed on the surface of the toner base particle.

10. The toner of claim 1, wherein the toner has an average circularity of from 0.975 to 0.985.

11. The toner of claim 1, wherein the toner has an average circularity of from 0.977 to 0.985.

12. The toner of claim 1, wherein the inorganic fine particle is included in the toner base particle in an amount of from 10 parts by mass to 25 parts by mass per 100 parts by mass of the toner base particles.

13. The toner of claim 1, wherein the inorganic fine particle is included in the toner base particle in an amount of from 15 parts by mass to 20 parts by mass per 100 parts by mass of the toner base particles.

14. A toner housing unit, containing the toner according to claim 1.

15. An image forming apparatus, comprising:
a toner housing unit containing the toner of claim 1;
an electrostatic latent image bearer;
an electrostatic latent image former configured to form an electrostatic latent image on the electrostatic latent image bearer;
an image developer configured to develop the electrostatic latent image with the toner to form a visible image;
a transferer configured to transfer the visible image onto a recording medium; and
a fixer configured to fix the visible image on the recording medium.

* * * * *